United States Patent [19]

Tsubota et al.

[11] Patent Number: 5,629,787
[45] Date of Patent: May 13, 1997

[54] METHOD FOR PRODUCING AN LCD BY PRESSING THE SUBSTRATES

[75] Inventors: Koujiro Tsubota, Nara; Kazuyoshi Fujioka, Higashiosaka; Yohji Yoshimura, Nara; Hiroyuki Ohgami, Tenri; Yutaka Takafuji, Nara; Katsumi Nomura, Tenri; Masumi Kubo, Nara; Hirokazu Kamei, Kashihara, all of Japan

[73] Assignee: Sharp Kabushiki Kaisha, Osaka, Japan

[21] Appl. No.: 447,952

[22] Filed: May 23, 1995

Related U.S. Application Data

[62] Division of Ser. No. 67,466, May 25, 1993, Pat. No. 5,499,127.

[30] Foreign Application Priority Data

May 25, 1992 [JP] Japan ................... 4-132870
Jul. 3, 1992 [JP] Japan ................... 4-177155

[51] Int. Cl.$^6$ ............... G02F 1/1339; G02F 1/1333; G02F 1/13
[52] U.S. Cl. .............. 349/153; 349/155; 349/158; 349/187
[58] Field of Search ................... 359/62, 80, 81, 359/82

[56] References Cited

U.S. PATENT DOCUMENTS

| | | | |
|---|---|---|---|
| 4,222,635 | 9/1980 | Julke | 359/80 |
| 4,626,303 | 12/1986 | Ogura | 359/80 |
| 4,923,552 | 5/1990 | Fukushima et al. | 156/285 |

FOREIGN PATENT DOCUMENTS

| | | | |
|---|---|---|---|
| 52-050252 | 4/1977 | Japan | 359/62 |
| 2-139518 | 5/1990 | Japan | 359/81 |
| 3-073930 | 3/1991 | Japan | 359/82 |

*Primary Examiner*—William L. Sikes
*Assistant Examiner*—Walter J. Malinowski
*Attorney, Agent, or Firm*—David G. Conlin; Brian L. Michaelis

[57] ABSTRACT

A liquid crystal display device including a first substrate, a second substrate, and a sealing member for bonding the first and the second substrates, wherein a spacer for determining a thickness of a gap between the first and the second substrates is included only in the sealing member and wherein d<D where D is the thickness of the gap and d is the thickness of the sealing member. The gap is filled with a liquid crystal. A method for producing a liquid crystal display including the steps of pressing a liquid crystal panel including a first substrate and a second substrate interposing a sealing member which contains a spacer mixed therein, the spacer determining a thickness of a gap between the first and the second substrates, in a state where an elastic sheet having a cutout corresponding to the liquid crystal panel is provided a surface of one of the first and the second substrates, the surface being out of contact with the sealing member; curling the sealing member; and injecting a liquid crystal into the gap.

16 Claims, 20 Drawing Sheets

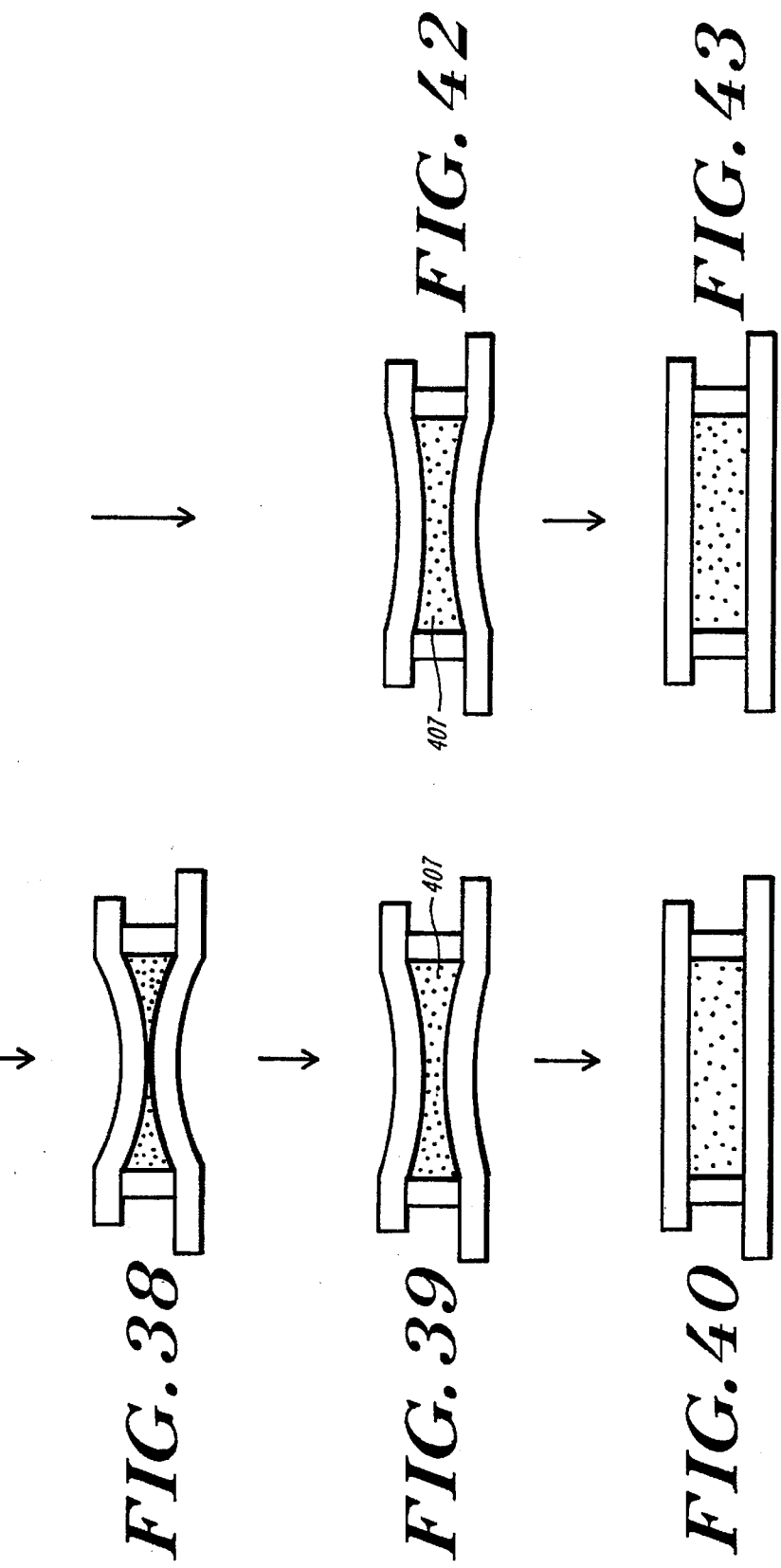

METHOD FOR PRODUCING AN LCD BY PRESSING THE SUBSTRATES

This is a divisional of application Ser. No. 08/067,466 filed on May 25, 1993, now U.S. Pat. No. 5,499,127.

BACKGROUND OF THE INVENTION

1. Field of the Invention:

The present invention relates to a liquid crystal display (hereinafter, referred to as LCD) device including a liquid crystal layer interposed between two substrates and to a method for producing the same.

2. Description of the Related Art:

An LCD device is produced by sealing a space between two substrates opposed to each other except for a portion acting as an injection opening and then injecting a liquid crystal into the space from the injection opening. Such an injection is conventionally performed by a liquid crystal injection apparatus which includes a liquid crystal bath in a chamber in which an inner pressure is adjustable. For example, the Injection is performed in the following manner. The inner pressure of the chamber is reduced to approximately $10^{-3}$ torr by a vacuum pump, and then an injection opening is immersed in a liquid crystal in the liquid crystal bath with the injection opening being directed downward. By increasing the inner pressure to an atmospheric level, the liquid crystal is injected between the two substrates sealed with a sealing member. Finally, the injection opening is coated with an ultraviolet curing resin by a dispenser or the like and is sealed by radiating ultraviolet to the ultraviolet curing resin.

Such an injection is simultaneously performed for a plurality of LCD devices, and the injection openings thereof are sealed after the liquid crystal is injected into all the LCD devices. Namely, the injection is continued until all the LCD devices are filled with the liquid crystal. However, the optimum injection period is different depending on each LCD device. Accordingly, an LCD device to which the liquid crystal has been injected for a longer period of time than an optimum injection period thereof obtains a thicker gap between the two substrates than an LCD device to which the liquid crystal has been injected only for an optimum period thereof. (Hereinafter, the above-mentioned gap will be referred to as the cell thickness.) As a result, there is a variation in the cell thickness among the LCD devices, which prevents images from being displayed as designed.

Such a variation in the cell thickness causes a variation in colors displayed by the LCD devices as well as in the response time and the threshold level of the voltage for switching the liquid crystal between a display state a non-display state. Such inconveniences lower the display quality of the LCD devices. The cell thicknesses of all the LCD devices are uniformized by interposing spacers each formed of a plastic bead, a glass fiber or the like between the two substrates. However, the alignment of liquid crystal molecules is impaired in the vicinity of the spacers, thereby lowering the display quality.

FIG. 1 is a plan view of a conventional LCD device 61, and FIG. 2 is a cross sectional view thereof along lines G—G of FIG. 1. The conventional LCD device 61 includes a first substrate 62 and a second substrate 63 both formed of a material which transmits light such as glass, and a liquid crystal layer 66 interposed between the first and the second substrates 62 and 63 and sealed with a sealing member 64. Spacers 65 formed of a resin or glass in a shape of a ball or a cylinder are provided in the liquid crystal layer 66 and the sealing member 64. The spacers 65 are adhered to the first and the second substrates 62 and 63, thereby determining the cell thickness, namely, the thickness of the liquid crystal layer 66.

Inner surfaces of the first and the second substrates 62 and 63 on the side of the liquid crystal layer 66 each have an alignment film and pixel electrodes thereon. The pixel electrodes are provided for applying a voltage to the liquid crystal for pixels by a simple matrix operation or an active matrix operation. The alignment films are provided for determining the alignment of liquid crystal molecules of the liquid crystal layer 66. When necessary, a color filter layer and a light shielding layer are further provided. In the case when an active matrix operation is performed, a switching device for controlling the voltage application to the pixel electrode is constituted by a thin film transistor (hereinafter, referred to as the TFT) formed of an amorphous silicon or a polysilicon and is provided on one of the inner surfaces.

A method for producing such a conventional LCD device 61 will be described.

First, the first and the second substrates 62 and 63 having the pixel electrodes and the alignment films thereon are prepared. A perimeter of the inner surface of the first substrate 62 is coated with the sealing member 64 such as a thermosetting resin or a photocuring resin by use of screen printing or the like except for an injection opening 67. Then, the spacers 65 are scattered by use of wet scattering or dry scattering in the ratio of 100 to 150 spacers 65 per 1 $mm^2$.

The first and the second substrates 62 and 63 are assembled after positioning, and then the sealing member 64 is cured by heating or ultraviolet radiation. In this manner, a liquid crystal panel is produced.

Then, an air pressure in the liquid crystal panel is reduced to a vacuum level, and the liquid crystal is injected into the liquid crystal panel through the injection opening 67. The injection opening 67 is sealed with another sealing member 68, thereby obtaining the LCD device 61. Thereafter, the first and the second substrates 62 and 63 are shaped as desired and cleaved, and a polarizing plate and a light reflection plate are added as necessary.

Such a conventional LCD device 61 has the following problems since the spacers 65 are provided in the liquid crystal layer 66. (1) When being scattered between the first and the second substrates 62 and 63, the spacers 65 tend to flocculate in a unit of several to several ten pieces. This phenomenon prevents the thickness of each liquid crystal layer from being uniform or lowers the transmittance of a portion of the liquid crystal layer 66 including the flocculated spacers 65, resulting in defective display. (2) The alignment of the liquid crystal molecules is impaired in the vicinity of the spacers 65, thereby lowering the optical modulation efficiency thereof, or light is leaked due to the transmittance of the spacers 65, thereby causing defective display or inferior contrast. (3) Since the cell thickness is adjusted by the injection period of the liquid crystal, simultaneous injection of the liquid crystal into a plurality of liquid crystal panels brings variation in the cell thickness among the liquid crystal panels due to errors in assembling the first and the second substrates 62 and 63 or errors in processing precision. Such a variation in the cell thickness causes inferior contrast of the LCD device. These problems are especially remarkable when a display image is enlarged in a projection apparatus using such an LCD device.

FIG. 3 shows another conventional method for assembling substrates for use in an LCD device.

The inner surface of the second substrate 63 is coated with the sealing member 64 (formed of a thermosetting resin)

having the spacers 65 mixed therein by use of screen printing along a sealing pattern, and the spacers 65 for controlling the cell thickness are scattered on the entire inner surface of the first substrate 62. The number of the spacers 65 to be scattered is approximately 100 to 150 pieces per 1 mm$^2$. Then, the two substrates 62 and 63 are assembled into a liquid crystal panel. The liquid crystal panel is set in a pressing machine including an upper surface plate 67 and a lower surface plate 69 and is applied with a pressing load so that the second substrate 63 is entirely pressurized with a uniform force. In this state, the sealing member 64 is cured by heating. By such a method, the cell thickness is controlled by the spacers 65 mixed in the sealing member 64 and the spacers 65 scattered on the first substrate 62.

In such a conventional method for producing the LCD device, a process of scattering the spacers 65 is indispensable to obtain a uniform cell thickness. In order to press the sealing member 64 into a thickness equal to the spacers 65 mixed therein, the pressing load is required to be large. In order to support the load and further maintain a uniform cell thickness, the spacers 65 are required in a large number. For these reasons, the scattering of the spacers 65 involves the following problems. (1) The ratio of a total area of pixels with respect to the display area is lowered due to a large number of spacers 65 existent in the display area, resulting in inferior display quality and contrast. (2) A luminance point is generated since the spacers 65 flocculate in a unit of several to several tens of pieces. (3) A pixel defect is generated by the breakage of the switching devices such as TFTs caused when the first and the second substrates 62 and 63 are pressed by the pressing machine.

In a case when the spacers 65 are not used, the display area has no medium for controlling the cell thickness. In such a state, the display area tends to be concaved or convex, thus preventing the cell thickness of each liquid crystal panel from being uniform. Accordingly, the display quality is lowered. In a case when the LCD, device is as large as having a side of 25 mm in length, it is significantly difficult to obtain a uniform cell thickness.

Conventionally, the LCD device having no spacer has a size of approximately 1 inch. If, after the liquid crystal is injected into a vacuum liquid crystal panel in a conventional manner, the inner pressure is increased to an atmospheric level at one time, the two substrates are both bent due to the difference between the inner pressure and the outer pressure of the liquid crystal panel. Such bending is not a serious problem in the case of an LCD device having a size of approximately 1 inch. In the case when the LCD device has a size of more than 1 inch, if a height of the bending portion exceeds the cell thickness, the two substrates contact each other. This phenomenon causes the following problems. (1) The switching devices such as TFTs are broken, or the alignment films formed on the inner surfaces of the substrates are damaged to cause inferior alignment. (2) Since it is difficult for the liquid crystal to be injected into the liquid crystal panel, it takes an excessively long period of time until the liquid crystal is fully injected. If the substrates are not finally separated, defective injection occurs.

SUMMARY OF THE INVENTION

A liquid crystal display device according to the present invention includes a first substrate, a second substrate, and a sealing member for bonding the first and the second substrates, wherein a spacer for determining a thickness of a gap between the first and the second substrates is included only in the sealing member and wherein d<D where D is the thickness of the gap and d is the thickness of the sealing member. The gap is filled with a liquid crystal.

A method for producing a liquid crystal display according to the present invention includes the steps of pressing a liquid crystal panel including a first substrate and a second substrate interposing a sealing member which contains a spacer mixed therein, the spacer determining a thickness of a gap between the first and the second substrates, in a state where an elastic sheet having a cutout corresponding to the liquid crystal panel is provided on a surface of one of the first and the second substrates, the surface being out of contact with the sealing member; curing the sealing member; and injecting a liquid crystal into the gap.

A method for producing a liquid crystal display device according to the present invention includes the steps of providing two substrates opposed to each other with a sealing member along a perimeter thereof except for an injection opening; supplying the injection opening with a liquid crystal in a larger amount than a specified amount to be injected; partially injecting the liquid crystal into a gap between the two substrates by a difference between a pressure inside the two substrates and a pressure outside the two substrates, thereby forming a liquid crystal layer; measuring a thickness of a central portion of the liquid crystal layer; mechanically adjusting the thickness of the central portion based on a result obtained by the measurement; and sealing the injection opening. The mechanical adjustment is performed by allowing the liquid crystal to be injected into the gap or by allowing the liquid crystal to be discharged from the gap.

A method according to the present invention for producing a liquid crystal display device including a pair of substrates combined together through a sealing member and a liquid crystal interposed between the substrates includes the steps of coating one of the substrates with a sealing member containing a spacer mixed therein, the spacer determining a thickness of a gap between the substrates; assembling the substrates in a state where the thickness of the gap is maintained only by the sealing member without any spacer existing in a display area at a central portion of the gap; curing the sealing member; cleaving the substrates to produce at least one liquid crystal panel; end injecting the liquid crystal into the gap.

A method according to the present invention for producing a liquid crystal display device including a pair of substrates combined together through a sealing member and a liquid crystal interposed between the substrates includes the steps of coating one of the substrates with a sealing member containing a spacer mixed therein, the spacer determining a thickness of a gap between the substrates; and assembling the substrates in a state where the thickness of the gap is maintained only by the sealing member without any spacer existing in a display area at a central portion of the gap. The display area has at least one side having a length of 25 mm or more.

A method according to the present invention for producing a liquid crystal display device including two substrates combined together through a sealing member containing a spacer mixed therein, the spacer determining a thickness of a gap between the substrates, the gap including no spacer in the display area at a central portion thereof includes the steps of entirely pressing at least one of the substrates by a complex pressing medium including a buffering member and a pressing member; and curling the sealing member and thus adhering the substrates to each other in a state of being pressed.

A method according to the present invention for producing a liquid crystal display device including two substrates combined together through a sealing member excluding a spacer, a gap between the two substrates being filled with a liquid crystal and a thickness of the gap being determined by an electrooptic characteristic of the liquid crystal, includes the steps of pressing at least one of the two substrates by a pressing force determined based on the thickness of the gap determined by the spacer; coating one of the two substrates with the sealing member; and curing the sealing member.

A method according to the present invention for producing a liquid crystal display device including a first substrate and a second substrate opposed to the first substrate, a liquid crystal layer interposed between the first and the second substrates, and a sealing member for bonding the first and the second substrates includes the steps of coating a perimeter of at least one of the first and the second substrates except for an injection opening thereof with the sealing member containing a spacer for determining a thickness of a gap between the first and the second substrates; reducing a pressure inside the first and the second substrates and the vicinity thereof to a vacuum level; coating the injection opening with the liquid crystal; and increasing the pressure in the vicinity of the first and the second substrates at a ratio by which the gap between the first and the second substrates is maintained, thereby allowing the liquid crystal to be injected into the gap.

Thus, the invention described herein makes possible the advantages of providing (1) a liquid crystal display which realizes high quality display by eliminating spacers from a liquid crystal layer and a method for producing the same; (2) a liquid crystal display device having a display area which is not concaved or convex in spite of having no spacer, having no pixel defect, being large in size, and having a high ratio of a total area of pixels with respect to the display area and a high contrast; and (3) a method for producing a liquid crystal display device having a uniform cell thickness without using spacers.

These and other advantages of the present invention will become apparent to those skilled in the art upon reading and understanding the following detailed description with reference to the accompanying figures.

BRIEF DESCRIPTION OF THE DRAWINGS

FIGS. 37 through 40 are views illustrating the change in the cell thickness of an LCD device produced according to a conventional method.

FIGS. 41 through 43 are cross sectional views of FIG. 35 along line H—H illustrating the change in the cell thickness of an LCD device produced according to the fifth example.

DESCRIPTION OF THE PREFERRED EMBODIMENTS

EXAMPLE 1

Figure 1:
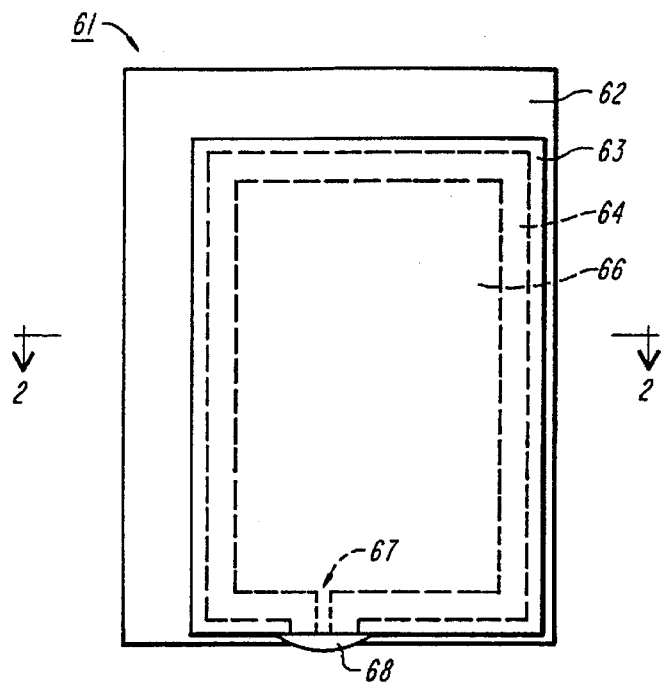
FIG. 1 is a plan view of a conventional LCD device.
Figure 2:
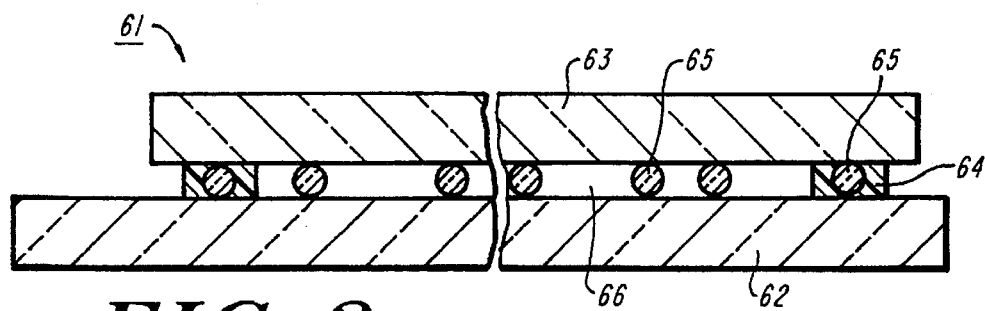
FIG. 2 is a cross sectional view along lines G—G of FIG. 1.
Figure 3:
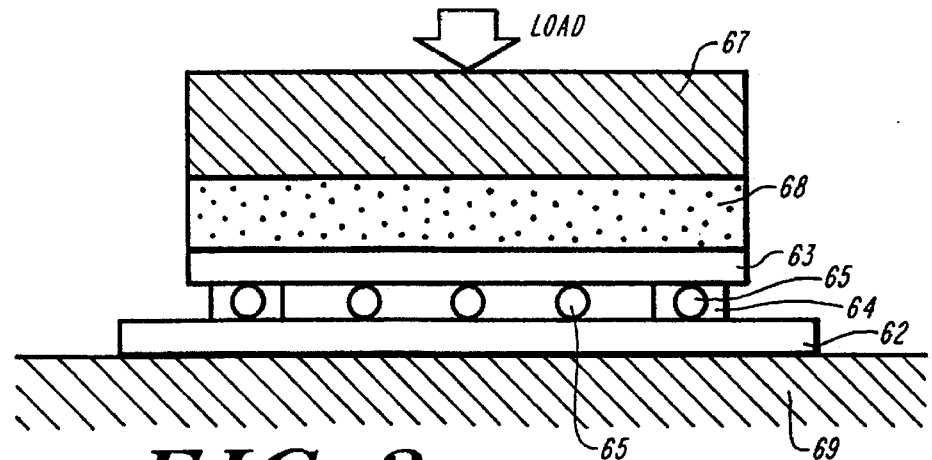
FIG. 3 is a cross sectional view illustrating a conventional method for assembling substrates for use in an LCD device.
Figure 4:
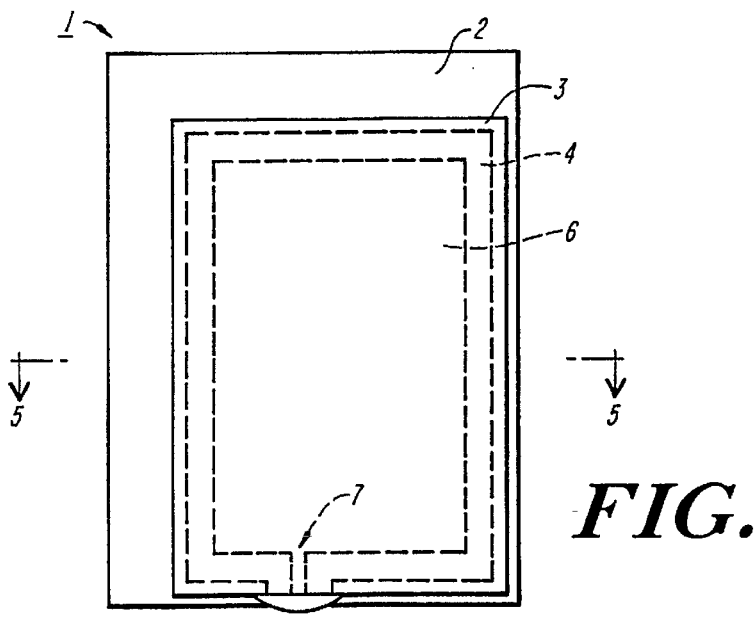
FIG. 4 is a plan view of an LCD device according to a first example of the present invention.
Figure 5:
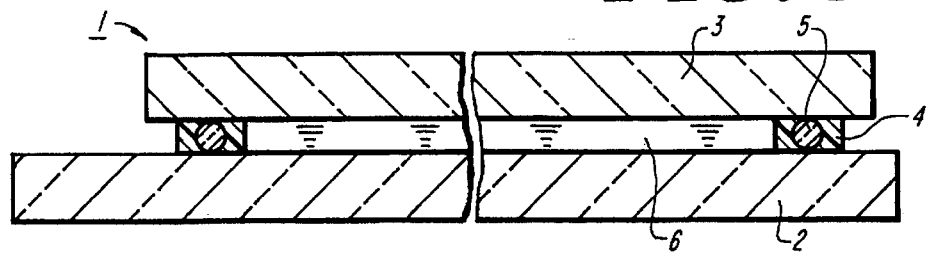
FIG. 5 is a cross sectional view along lines A—A of FIG. 4.

FIG. 4 is a plan view of an LCD device 1 according to a first example of the present invention, and FIG. 5 is a cross sectional view along lines A—A of FIG. 4.

The LCD device 1 includes a first substrate 2 and a second substrate 3 both formed of a material which transmits light such as glass, and a liquid crystal layer 6 interposed between the first and the second substrates 2 and 3 and sealed with a sealing member 4. Spacers 5 formed of a resin or a glass into a shape of a ball or a cylinder are contained only in the sealing member 4. The spacers 5 are adhered to the first and the second substrates 2 and 3, thereby determining the thickness of the liquid crystal layer 6, namely, the cell thickness.

Inner surfaces of the first and the second substrates 2 and 3 on the side of the liquid crystal layer 6 each have an alignment film pixel electrodes thereon. The pixel electrodes are provided for applying a voltage to the liquid crystal for pixels of a display image by a simple matrix operation or an active matrix operation. The alignment films are provided for determining the alignment of liquid crystal molecules of the liquid crystal layer 6. When necessary, a color filter layer and a light shielding layer are further provided. In the case when an active matrix operation is performed, a switching device for controlling the voltage application to the pixel electrode is formed of an amorphous silicon or a polysilicon and is provided on one of the inner surfaces.

Figure 6:
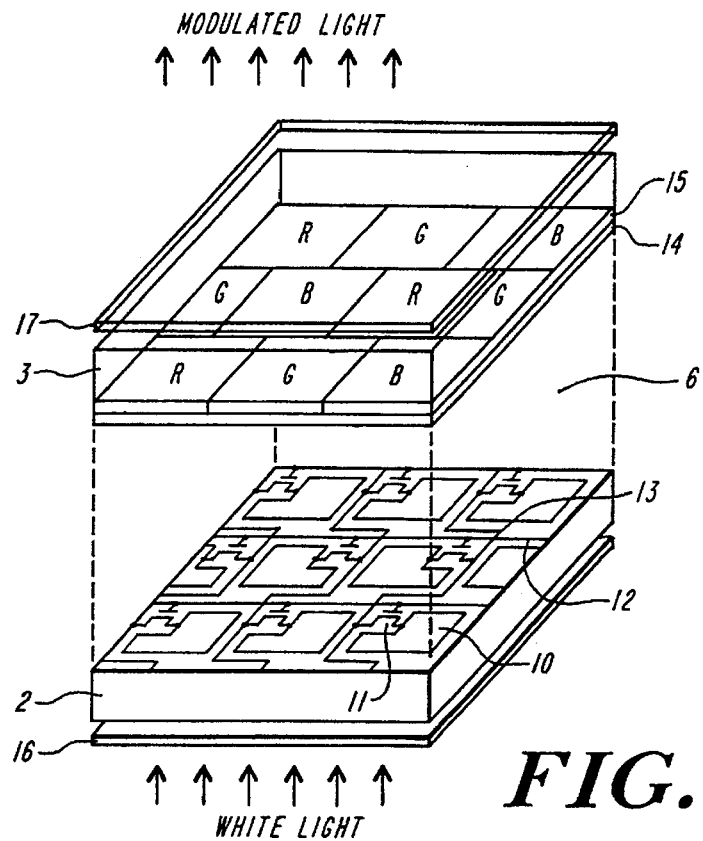
FIG. 6 is an exploded perspective view of a color LCD apparatus which includes the LCD device shown in FIGS. 4 and 5.

FIG. 6 is an exploded perspective view of an active matrix color LCD apparatus which includes the LCD device shown in FIGS. 4 and 5. On an inner surface of the first substrate 2, a plurality of pixel electrodes 10 arranged in zigzags, a plurality of switching devices 11 for respectively controlling voltage application to the pixel electrodes 10, a scanning electrode 12 for driving the switching devices 11, and a signal electrode 13 for conveying a display signal to the switching devices 11 are provided.

On an inner surface of the second substrate 3, a color filter layer 15 including a red (R) section, a green (G) section and a blue (B) section is provided. Each section corresponds to each pixel electrode 10. A common electrode 14 is provided on the color filter layer 15.

The first and the second substrates 2 and 3 have a liquid crystal layer 6 interposed therebetween. Further, an outer surface of the first substrate 2 has a polarizer 16 thereon, and an outer surface of the second substrate 3 has a polarizer 17 thereon. For example, when white light is incident on the outer surface of the first substrate 2, the optical properties of the liquid crystal is changed by a voltage applied between the pixel electrode 10 and the common electrode 14, thereby modulating the light transmitted through the color LCD apparatus to the outer surface of the second substrate 3.

Since a color LCD apparatus having the above-mentioned construction has no spacer, high quality images can be displayed with no defects.

A method for producing the LCD device 1 shown in FIGS. 4 and 5 will be described.

The first and the second substrates 2 and 3 having the pixel electrodes and the alignment films thereon are prepared. The spacers 5 formed of, for example, 8 glass fiber having a diameter of 5 μm are scattered in an ultraviolet curing resin such as an epoxy acrylate resin in a mixture ratio of 50 mg of the spacers 5 per 1 g of the resin. In this manner, the sealing member 4 is obtained.

Figure 7:
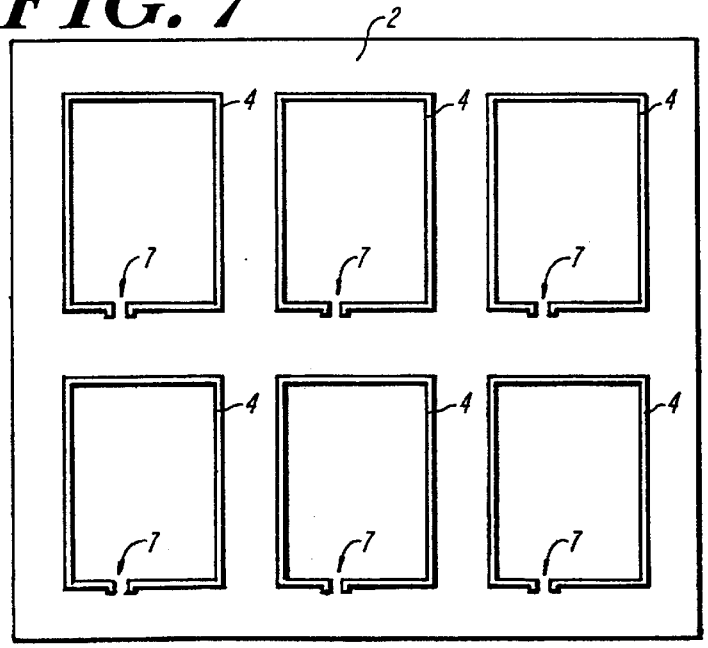
FIG. 7 is a plan view of a first substrate having sealing patterns.

As is shown in FIG. 7, a perimeter of the inner surface of the first substrate 2 is coated with the sealing member 4 having the spacers 5 scattered therein by use of seal printing or screen printing along sealing patterns except for an injection opening 7. The perimeter to be coated has a width of approximately 0.4 min. Hereinafter, a method for producing six liquid crystal panels using one first substrate 2 will be described, but the present invention is not limited to such a construction.

Figure 8:
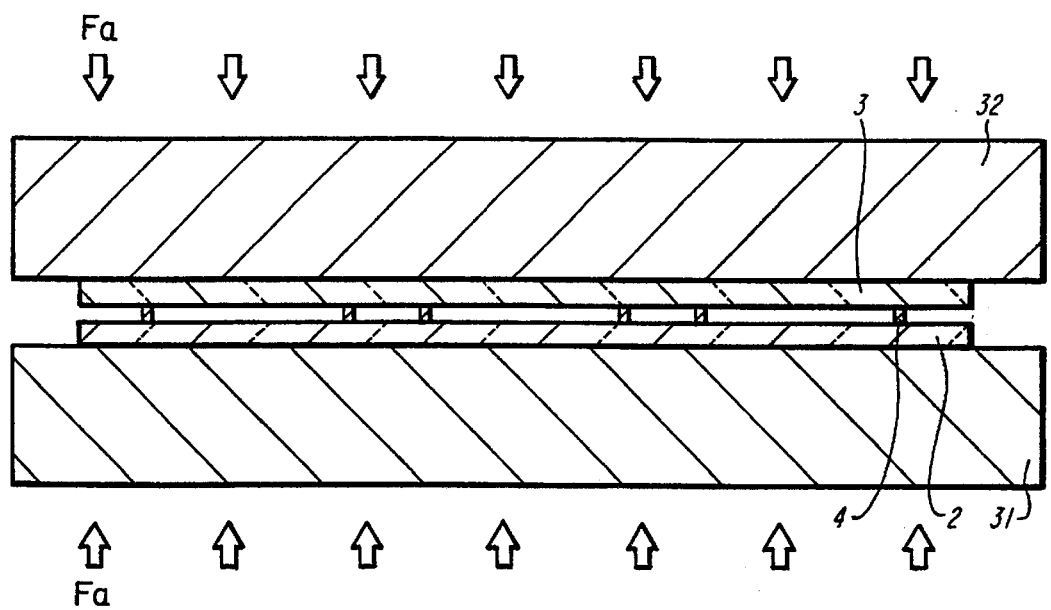
FIG. 8 is a cross sectional view of a pressing machine for pressurizing a sealing member between the first and a second substrates.

As is shown in FIG. 8, the first and the second substrates 2 and 3 are aligned to each other and assembled into a liquid crystal panel. The liquid crystal panel is set in a pressing machine including an upper surface plate 32 and a lower surface plate 31 both formed of a metal. The liquid crystal panel is entirely applied with a force Fa so that the first and the second substrates 2 and 3 are each applied with a pressing force of 1 to 1.5 kg/cm$^2$. In this manner, the sealing member 4 is pressurized until the spacers 5 mixed in the sealing member 4 adhere the first and the second substrates 2 and 3.

Figure 9:
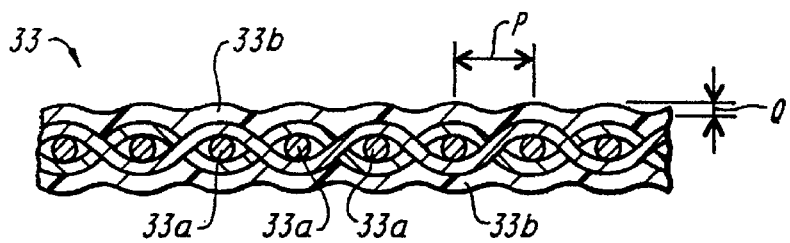
FIG. 9 is a partial cross sectional view of an elastic sheet.
Figure 10:
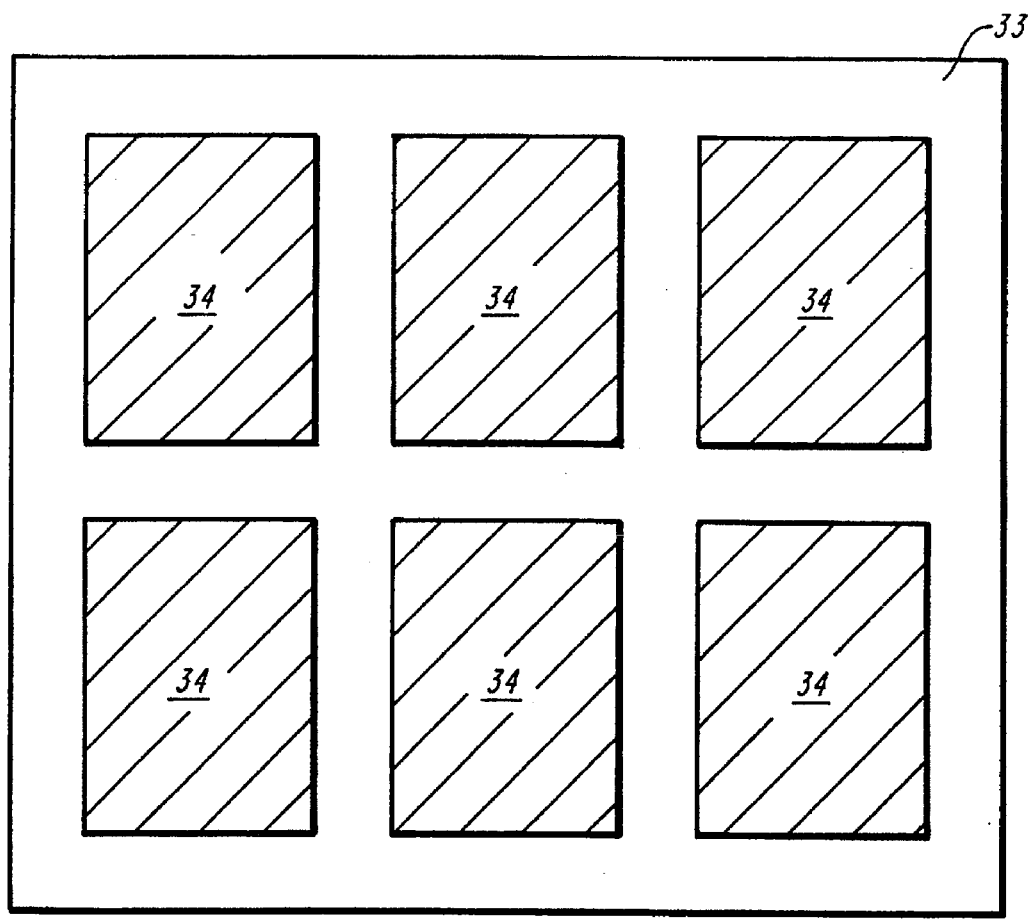
FIG. 10 is a view of the elastic sheet illustrating shapes of cutout areas thereof.
Figure 11:
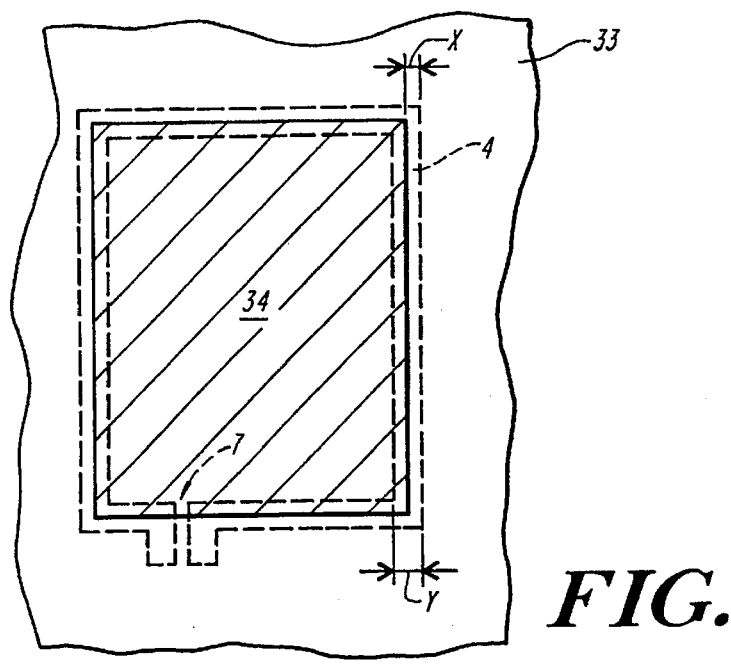
FIG. 11 is a partially enlarged view of one of the cutout areas.

As is shown in FIG. 9, an elastic sheet 33 is prepared having a thickness of approximately 0.15 mm. The elastic sheet 33 is prepared by plain-weaving a glass fiber 33a to obtain a cloth, and then impregnating the cloth with a fluorine resin 33b. As is shown in FIG. 10, shaded areas 34 of the elastic sheet 33 substantially corresponding to the horizontal profile of the liquid crystal panels are cut out. FIG. 11 is a partially enlarged view of one of the shaded areas 34. Where X is the distance between an end of the shaded area 34 and an outer perimeter of the sealing member 4 after being pressed, and Y is the width of the sealing member 4 after being pressed, X and Y preferably have the relationship to fulfill the formula: $Y/3 \leq X \leq Y/2$.

Figure 12:
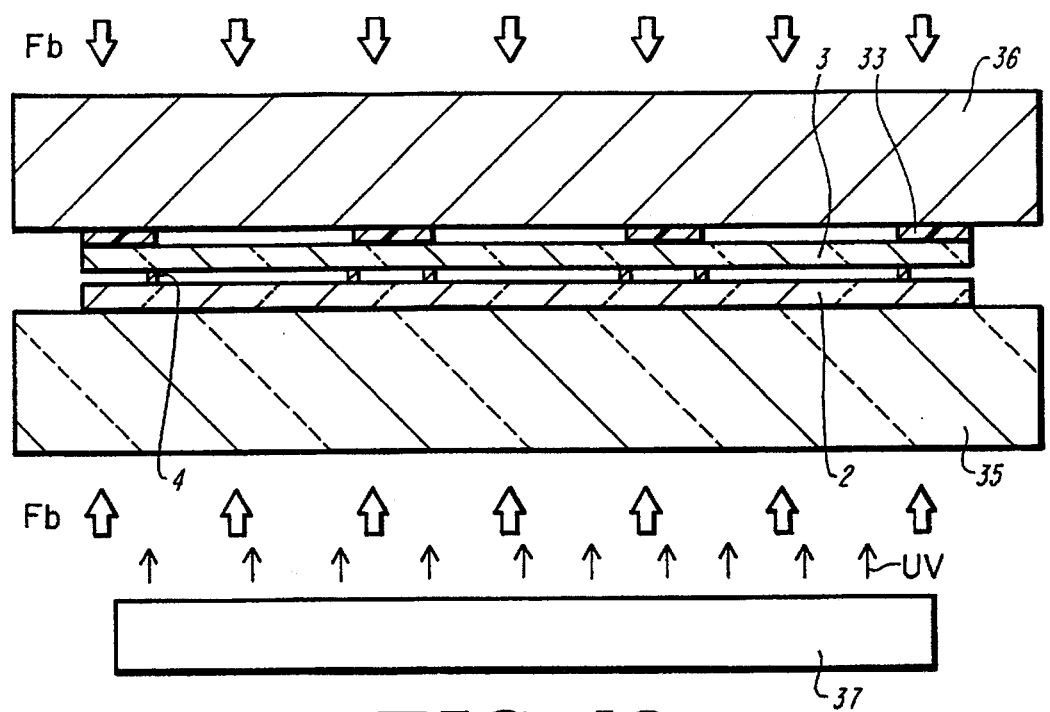
FIG. 12 is a cross sectional view of a pressing machine illustrating a process of pressing the first and the second substrates with the elastic sheet interposed therebetween.
Figure 13A:
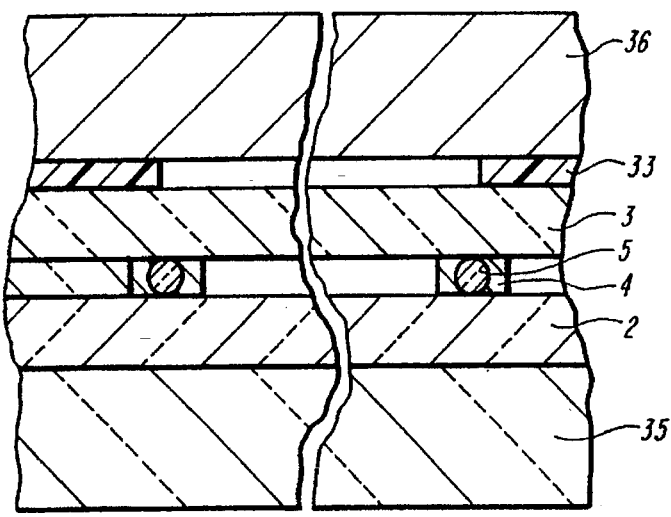
FIG. 13 is a partial view of FIG. 12.
Figure 13B:
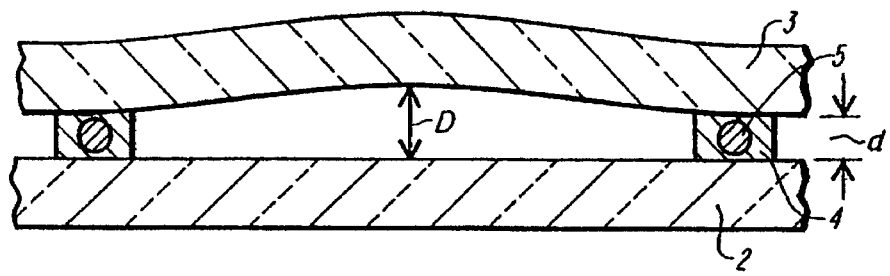

Next, as is shown in FIG. 12, the elastic sheet 33 is put on the outer lower surface of the second substrate 3 to be in contact with a pressing machine and the positioning as is shown in FIG. 11 is performed. Then, the liquid crystal panel is set in the pressing machine including a lower surface plate 35 formed of silica glass and an upper surface plate 36 formed of a metal. A force Fb is applied to the entire liquid crystal panel so that the first and the second substrates 2 and 3 are each applied with a pressing force of 1 kg/cm$^2$ or less. Since the elastic sheet 33 is arranged to have an edge thereof above the sealing member 4 as is shown in FIG. 13, the pressing force is concentrated to an area of the liquid crystal panel corresponding to the elastic sheet 33. As a result, the second substrate 3 is deformed in such a manner that a gap between the first and the second substrates 2 and 3 is narrow outside the sealing member 4 and is wide inside the sealing member 4. In order to uniformly distribute the pressing force to the entire elastic sheet 33, it is desirable that the elastic sheet 33 has a surface roughness on two surfaces thereof, waves of the surface roughness having a height Q of 5 μm to 30 μm and a periodicity P of 200 μm to 800 μm (FIG. 9).

In the state where the second substrate 3 is deformed in this manner, ultraviolet is radiated from an optical source 37 provided below the lower surface plate 35 toward the liquid crystal panel for a specified period of time, thereby curing the sealing member 4. In the liquid crystal panel thus obtained, the gap between the first and the second substrates and 3 inside the sealing member 4 is thicker than sealing member 4. In other words, the thickness of the area to which the liquid crystal is to be injected is larger than the thickness of the sealing member 4. Practically, the thickness of the gap between the first and the second substrates 2 and 3 is 5 μm at the spacers 5, 5.2 μm±0.1 μm inside the sealing member 4, and approximately 5.8 μm at a central portion of the liquid crystal panel.

Figure 14:
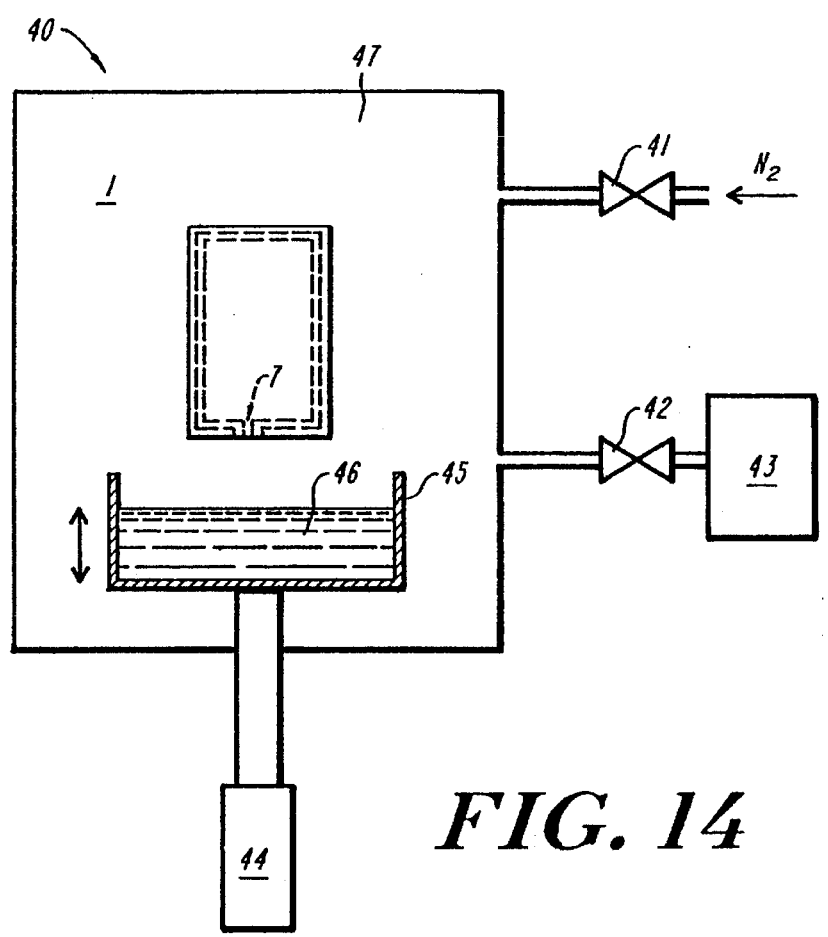
FIG. 14 is a schematic view of a liquid crystal injection apparatus.

After that, the first and the second substrates 2 and 3 constituting six such liquid crystal panels are cut into each liquid crystal panel. A group of, for example, ten such liquid crystal panels are accommodated in a jig with the injection openings 7 thereof being uniformly directed, and fixed inside a liquid crystal injection apparatus 40 shown in FIG. 14. The liquid crystal injection apparatus 40 includes a chamber 47 which is connected to a pressure reducing pump 43 through a valve 42 and is equipped with a leak valve 41 for introducing nitrogen gas $N_2$. In the chamber 47, a tank 45 containing a liquid crystal 46 is provided so as to be movable upward and downward by a linear moving apparatus 44.

The pressure reducing pump 43 is driven by opening the valve 42 and the pressure inside the chamber 47 is lowered to $1 \times 10^{-4}$ to $3 \times 10^{-4}$ tort, when the valve 42 is closed to stop the pressure reducing pump 43. The tank 45 is moved upward to immerse the injection openings 7 of the liquid crystal panels in the liquid crystal 46 contained in the tank 45, and then the leak valve 41 is opened to introduce the nitrogen gas $N_2$ into the chamber 47, thereby increasing the pressure inside the chamber 47 almost to an atmospheric level. In this manner, the liquid crystal 46 is injected into the liquid crystal panels.

The liquid crystal panels are taken out of the chamber 47, and the injection openings 7 are sealed with another sealing member such as a resin. Thus, the LCD devices 1 shown in FIGS. 4 and 5 are provided. According to actual measurement, an LCD device which was taken out of the chamber 47 immediately after the injection of the liquid crystal 46 had a cell thickness of 5.2 μm±0.15 μm. An LCD device which was taken out of the chamber 47 one hour after the injection of the liquid crystal 46 had a cell thickness of 5.3 μm±0.1 μm. As is apparent from these results, in the case when the liquid crystal panels are pressed through the elastic sheet 33 having the cutout areas corresponding to the liquid crystal panels and the sealing member 4 is cured in that state, the cell thickness can be controlled with no dependency on the injection period of the liquid crystal 46. The error of the cell thickness of the LCD devices 1 thus obtained is within approximately ±5%, which indicates very small variation in production.

EXAMPLE 2

Figure 15:
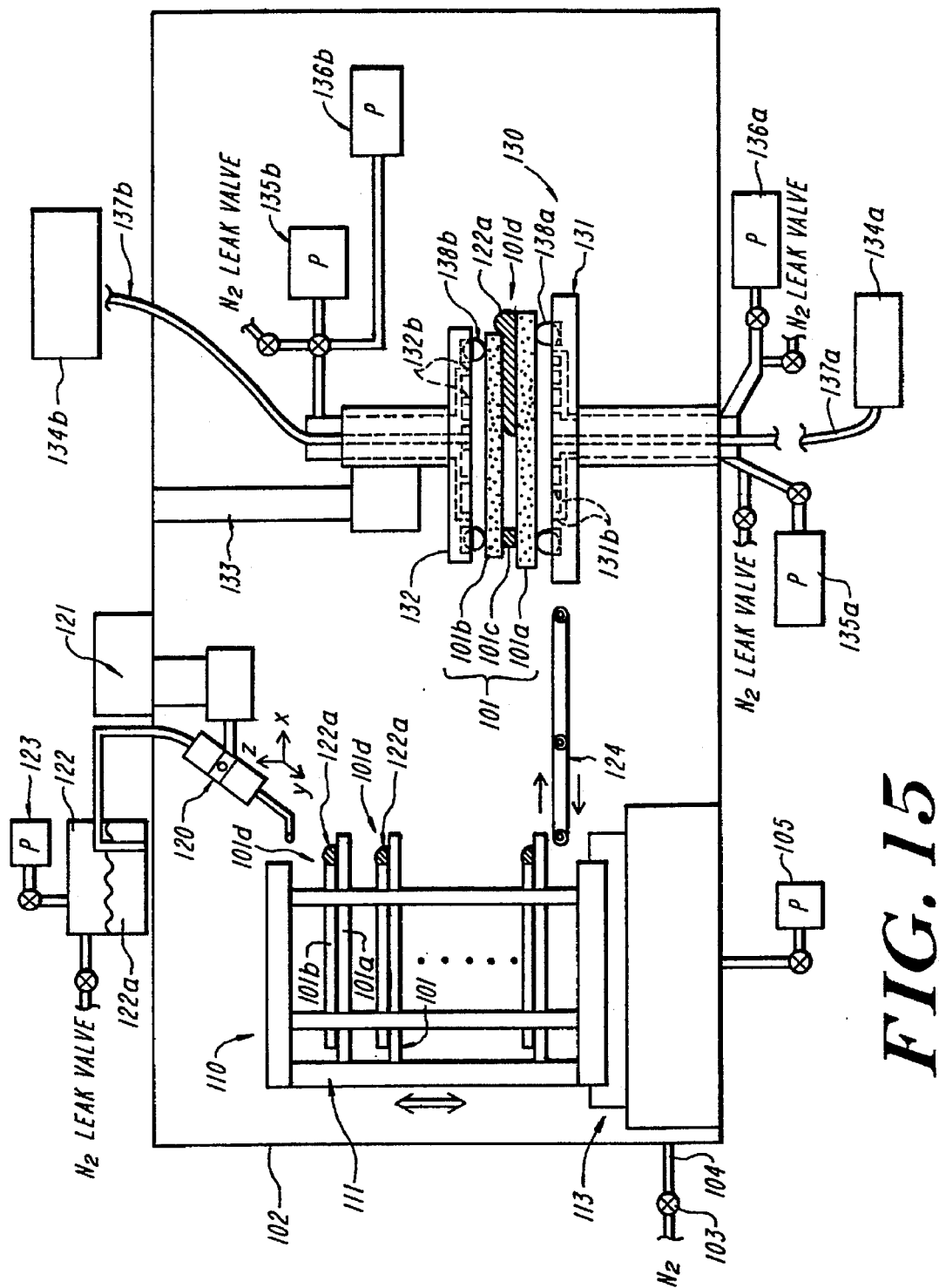
FIG. 15 is a schematic view of a liquid crystal injection apparatus according to a second example of the present invention.

FIG. 15 shows a liquid crystal injection apparatus according to a second example of the present invention.

Figure 16:
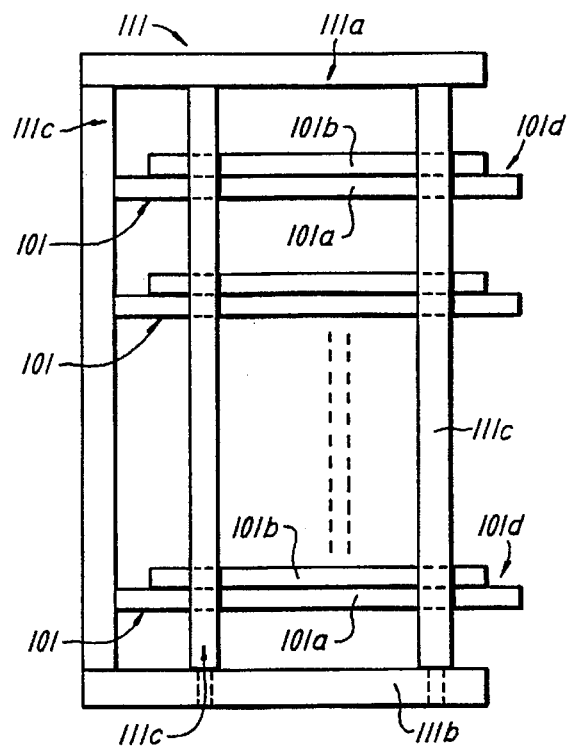
FIG. 16 is a side view of an elevating mechanism of a liquid crystal injection jig.
Figure 17:
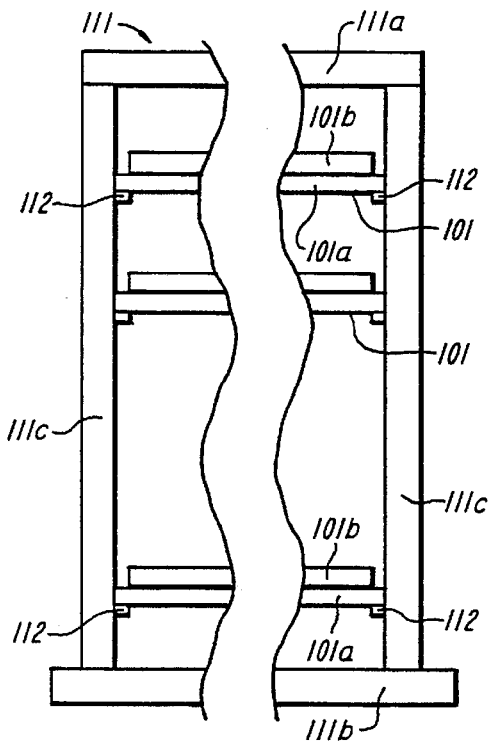
FIG. 17 is a front view of the elevating mechanism shown in FIG. 16.

The liquid crystal injection apparatus includes a chamber 102. The pressure inside the chamber 102 is lowered by a pressure reducing pump 105 to a vacuum level and is Increased to an atmospheric level when a leak valve 103 is opened to introduce nitrogen gas running through a tube 104. The chamber 102 includes an elevating mechanism 110 of a liquid crystal injection jig 111. As is shown in FIGS. 16 and 17, the elevating mechanism 110 has a liquid crystal injection jig 111 which includes an upper plate 111a, a lower plate 111b and a supporting column 111c. The supporting column 111c has a plurality of supporting members 112 at different levels on an inner surface thereof. Liquid crystal panels are set on the supporting members 112. The liquid crystal injection jig 111 is entirely moved upward and downward by an elevating apparatus 113 (FIG. 15). The supporting members 112 are coated with Teflon® in order not to damage the LCD devices 101 when being set.

The chamber 102 further includes a dispenser 120 for supplying a liquid crystal 122a to the LCD devices 101 which are set on the supporting members 112. The dispenser 120 is supported by a control mechanism 121 for moving the dispenser 120 in X, Y and Z directions. The dispenser 120 is supplied with the liquid crystal 122a from a liquid crystal tank 122. The dispenser 120 injects the liquid crystal 122a into the liquid crystal panels using the control mechanism 121, thereby producing LCD devices 101. The liquid crystal tank 122 is provided with a defoaming pump 123 for defoaming the liquid crystal 122a.

In the vicinity of the elevating mechanism 110, a moving mechanism 124 is provided for receiving the LCD devices 101 from the elevating mechanism 110 and transporting the LCD devices 101 to a thickness adjusting mechanism 130. The moving mechanism 124 includes a belt conveyer and is fixed at a certain height. The LCD devices 101 are transported from the elevating mechanism 110 to the moving mechanism 124 in the following manner. The elevating mechanism 110 is entirely lowered until one of the LCD devices 101 contacts a belt of the moving mechanism 124. Then, the moving mechanism 124 pulls the LCD device 101 out of the elevating mechanism 110 and transports the LCD device 101 to the thickness adjusting mechanism 130.

The thickness adjusting mechanism 130 includes a lower stage 131 and an upper stage 132. The lower stage 131 is fixed at a certain height, and the upper stage 132 is lovable upward and downward by an elevating mechanism 133. The LCD device 101 transported by the moving mechanism 124 is set on the lower stage 131. In FIG. 15, the LCD device 101 on the lower stage 131 is shown in the state of being enlarged in size. The lower stage 131 has, at an upper surface thereof, an end of an optical fiber 137a for measuring the cell thickness and holes 131b for adjusting the pressure in the LCD device 101. The other end of the optical fiber 137a is connected to a thickness measuring apparatus 134a for measuring the cell thickness. A hole 131b is connected to a pump 135a through a passage, the pump 135a suctioning the LCD device 101 toward the lower stage 131. Another hole 131b is connected to a compressor 136a through a passage, the compressor 136a pressing the LCD device 101. The upper stage 132 has, at a lower surface thereof, an end of an optical fiber 137b for measuring the cell thickness and holes 132b for adjusting the pressure in the LCD device 101. The other end of the optical fiber 137b is connected to a thickness measuring apparatus 134b for measuring the cell thickness. A hole 132b is connected to a pump 135b through a passage, the pump 135b suctioning the LCD device 101 toward the upper stage 132. Another hole 132b is connected to a compressor 136b through a passage, the compressor 136b pressing the LCD device 101. The upper surface of the lower stage 131 and the lower surface of the upper stage 132 has O-rings 138a and 138b, respectively.

Using the liquid crystal injection apparatus having the above-mentioned construction, the liquid crystal 122a is injected in the following manner.

Figure 18:
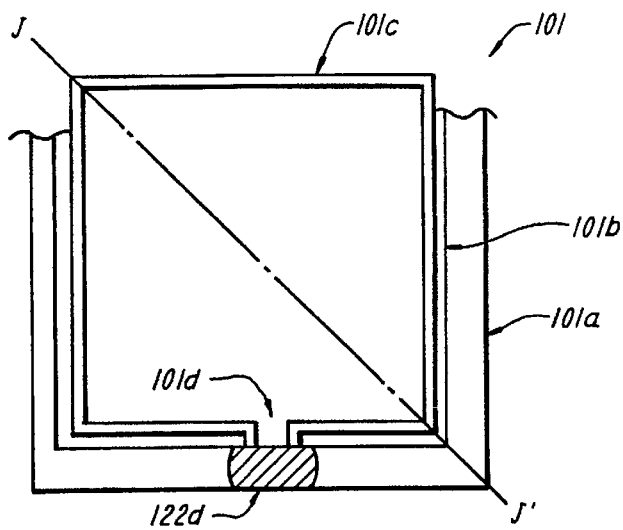
FIG. 18 is a plan view of an LCD device in the middle of the production process according to the second example.

First, a liquid crystal panel using a 3-inch TFT without a liquid crystal is produced in the usual manner. As is shown in FIG. 18, the liquid crystal panel includes a TFT substrate 101a having a TFT acting as a switching device and a counter substrate 101b opposed to each other. The TFT substrate 101a and the counter substrate 101b are each coated with a sealing member 101c along a perimeter of an inner surface except for an injection opening 101d. No spacer for keeping the cell thickness uniform is provided between the substrates 101a and 101b. A plurality of such liquid crystal panels are set on the supporting members 112 of the elevating mechanism 110 with the injection openings 101d thereof being directed uniformly as is shown in FIG. 15.

The pressure reducing pump 105 is driven to reduce the pressure inside the chamber 102 to 1 to $3\times10^4$ torr or less. Then, the pressure reducing pump 105 is stopped, and the dispenser 120 filled with the liquid crystal 122a which is supplied from the liquid crystal tank 122 and has already been defoamed is operated by the control mechanism 121 so as to drop the liquid crystal 122a in a specified amount onto the vicinity of the injection openings 101d. The specified amount is determined based on twice the capacity of the liquid crystal panel which is obtained from the size of the liquid crystal panel and the thickness of the liquid crystal layer. In the case when the variation in the capacity among the liquid crystal panel is small, a smaller amount is sufficient.

The leak valve 103 is opened to introduce the nitrogen gas $N_2$ into the chamber 102. By the introduction of the nitrogen gas, there occurs a difference between the pressure inside the liquid crystal panels and the pressure in the chamber 102, namely, outside the liquid crystal panels. Thus, the liquid crystal 122a is injected into the liquid crystal panels to produce the LCD devices 101 simultaneously with the introduction of the nitrogen gas.

When the liquid crystal 122a is completely injected into the LCD devices 101 with no air bubbles, the elevating mechanism 110 is lowered, and the LCD device 101 on the lowest supporting member 112 is pulled out of the elevating mechanism 110 and transported onto the lower stage 131 of the thickness adjusting mechanism 130 by the moving mechanism 124. When the LCD device 101 is set, the upper stage 132 is lowered by the elevating mechanism 133, thereby balding the LCD device 101 between the upper and the lower stages 132 and 131. A gap between the lower stage 131 and the LCD device 101 is sealed by the O rings 138a, and a gap between the upper stage 132 and the LCD device 101 is sealed by the O rings 138b.

Then, the cell thickness is measured in a state where the liquid crystal molecules are aligned in a twisted nematic manner so as to act as an optical modulation device. The measurement is performed by scanning a wavelength of a visible light beam by the optical fibers 137a and 137b buried In the stages 131 and 132 through polarizers (not shown), and then evaluating the wavelength dependency of the intensity of the light transmitted through the liquid crystal layer. The cell thickness is calculated by a computer provided at one of the thickness measuring apparatuses 134a and 134b.

Figure 19:
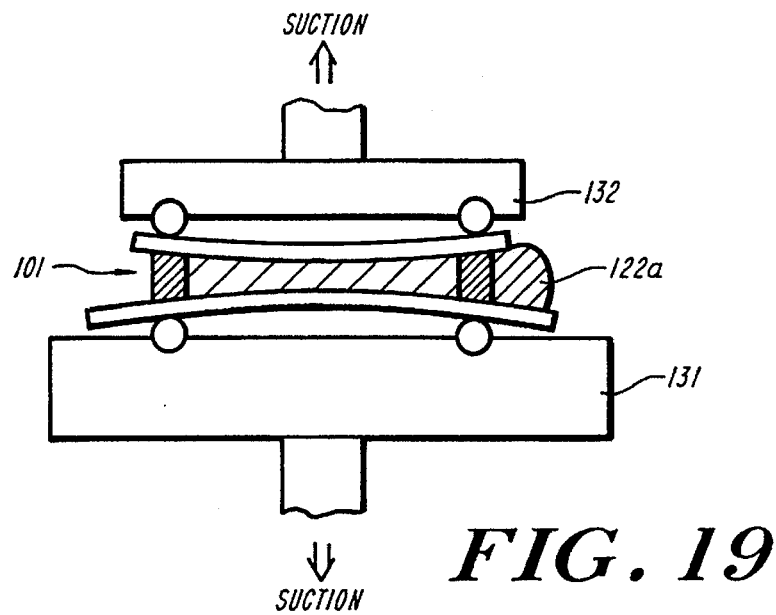
FIG. 19 is a cross sectional view of the LCD device illustrating a process of suctioning two substrates thereof when the cell thickness is small.
Figure 20:
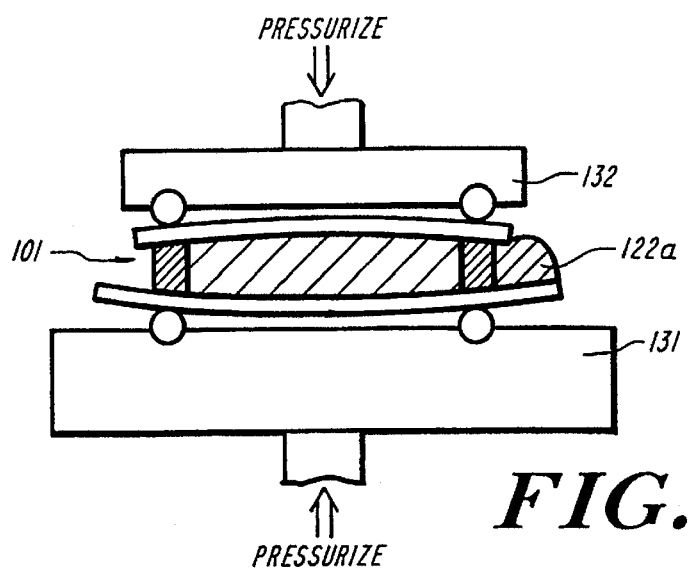
FIG. 20 is a cross sectional view of the LCD device illustrating a process of pressing the two substrates thereof when the cell thickness is large.

Then, the computer outputs a signal for driving the pumps 135a and 135b or the compressors 136a and 136b, depending on the cell thickness. Practically, when the cell thickness is small as is shown in FIG. 19, the pumps 135a and 135b are driven, thereby suctioning the TFT substrates 101a upward and the counter substrate 101b downward so as to increase the cell thickness of the entire LCD device 101. By this operation, the liquid crystal 122a coated in the vicinity of the injection opening 101d is absorbed inside the LCD device 101. The suctioning force is fine-adjustable by using both of the pressure reducing pump 105 and the leak valve 103. When the cell thickness is large as is shown in FIG. 20, the compressors 136a and 136b are driven, thereby pressing the TFT substrate 101a upward and the counter substrate 101b downward. By this operation, the liquid crystal 122a in the LCD device 101 is discharged from the injection opening 101d. The pressure is desirably, for example, approximately 1 kg/cm². The cell thickness of the LCD device 101 is adjusted in this manner. The cell thickness is continuously controlled at a desirable constant value by the thickness measuring apparatuses 134a and 134b.

When a specified thickness is obtained, the injection opening 101d is coated with an ultraviolet curing resin. Ultraviolet is radiated to the resin, thereby sealing the injection opening 101d.

After the LCD device 101 which is pulled out of the lowest supporting member 112 of the elevating mechanism 110 is completely sealed, the LCD device 101 is transported back onto the original supporting member 112 by the moving mechanism 124. Then, the next LCD device 101 is transported to the thickness adjusting mechanism 130, and the procedure mentioned above is repeated for each LCD device 101.

As has been described so far, according to the second example of the present invention, the thickness of a central portion of the liquid crystal layer interposed between the two substrates 101a and 101b is measured. Based on the measurement result, the thickness of the central portion is mechanically adjusted by allowing the liquid crystal 122a to be absorbed into the LCD device 101 or to be discharged from the LCD device 101. Thus, the cell thickness is uniformized.

Figure 21:
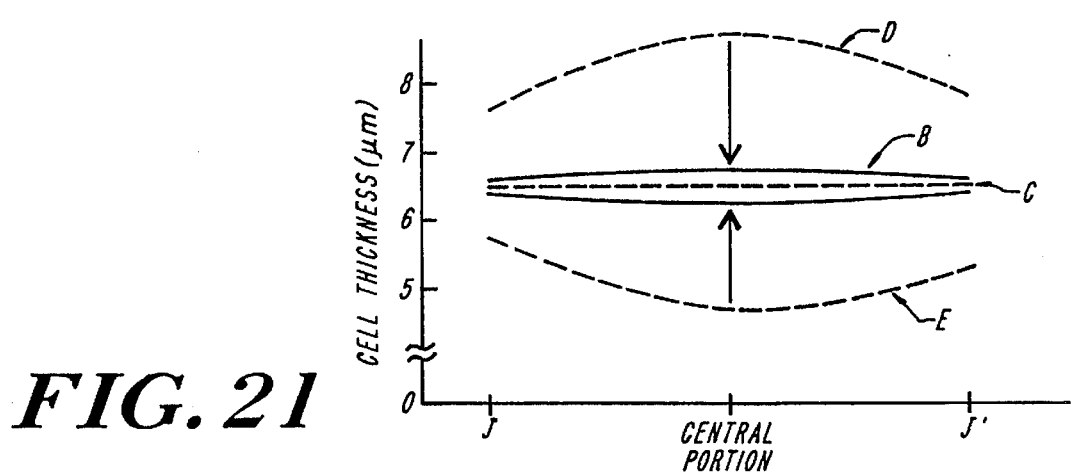
FIG. 21 is a graph showing the distribution of the cell thickness of LCD devices produced according to the second example of the present invention and in conventional methods.

FIG. 21 shows the distributions of the cell thickness of the LCD devices 101 according to the present invention and conventional LCD devices. The cell thickness was measured at a position on a diagonal line J-J' in FIG. 18. In FIG. 21, B shows the distribution of the cell thickness of the LCD devices 101 according to the second example of the present invention. C concerns LCD devices having spacers between two substrates. D concerns LCD devices having a thick liquid crystal layer as a result of injecting the liquid crystal with no spacer interposed between two substrates. E concerns LCD devices having a thin liquid crystal layer as a result of injecting the liquid crystal with no spacer interposed between two substrates.

As is apparent from FIG. 21, LCD devices 101 according to the second example of the present invention are slightly inferior in the uniformity of the cell thickness than the LCD devices having spacers between the two substrates (shown by C), but are significantly superior than the LCD devices into which the liquid crystal is injected without using spacers (shown by D and E).

According to the second example of the present invention, it is possible to keep the cell thickness uniform and at a constant value without spacers while the liquid crystal is injected and the injection opening 101d is sealed. This provides an advantage that, when the LCD 101 is used in a projector for an enlarged image, there occurs no such defect that the light is transmitted only through an area corresponding to the spacer which would occur in a conventional LCD device produced by scattering spacers. As a result, high image quality is obtained.

EXAMPLE 3

A method for producing an LCD device according to a third example of the present invention will be described with reference to FIGS. 22 through 27. In an LCD device having no spacers except in a sealing member, two substrates are easily distorted at 6 central portion of a gap interposed therebetween corresponding to a display area. Further, the cell thickness between the two substrates is changed depending on the amount of the liquid crystal which is injected, and this promotes the distortion. In order to produce an LCD device which is not distorted by the injection of the liquid crystal, it is necessary to assemble the two substrates so as to have a cell thickness with a highest possible uniformity before the liquid crystal is injected.

According to the third example, an LCD device is produced in the following manner.

One of either the upper substrate 204 or the lower substrate 206 is coated with a sealing member 205 containing spacers 208, and the two substrates 204 and 206 are assembled and entirely pressed by a pressing machine. The sealing member 205 contains a polymerization initiator which is activated by ultraviolet radiation and a material which is thermally activated.

Figure 24:
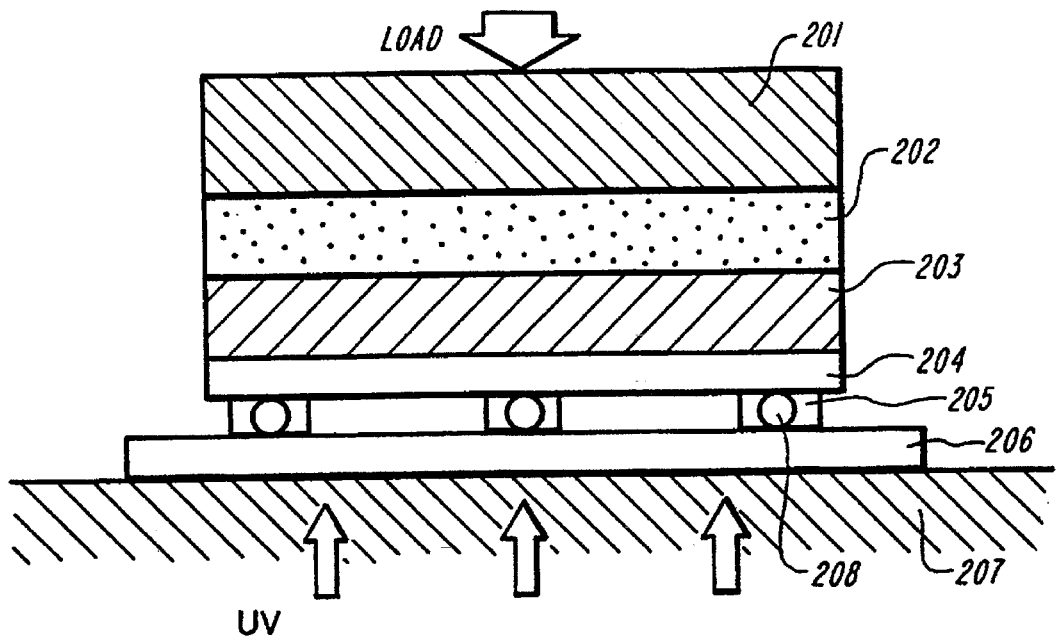
FIG. 24 is a cross sectional view of a pressing machine used in the third example.

As is shown in FIG. 24, the pressing machine includes an upper surface plate 201, a lower surface plate 207, a buffering layer 202 for absorbing non-uniform distribution of the pressing force and a flat pressurizing layer 203 having a high resiliency against deflection. The pressurizing layer 203 has a surface roughness which is smaller than that of the substrates 204 and 206 and further has a higher resiliency against deflection than that of the substrates 204 and 206. The buffering layer 202 and the pressurizing layer 203 constitute a complex pressing member. The resiliency against deflection is determined based on the shape, size and properties (especially, the longitudinal modulus of elasticity) of the member. The buffering layer 202 absorbs non-uniformity in the distribution of the pressing force and in the thickness of the substrates 204 and 206, thereby allowing the substrates 204 and 206 to be uniformly pressed. The pressurizing layer 203 significantly restricts the deflection of the substrates 204 and 206 in the display area where no spacer exists when a load is applied. By such a combination of the buffering layer 202 and the pressurizing layer 203, the sealing member 205 is effectively pressed. At this point, a groove is formed at a surface of the pressurizing layer 202 in order to restrict the non-uniform distribution of the pressing force caused by the air (compressed fluid) existent between the upper substrate 204 and the pressurizing layer 203 and also to allow the substrates 204 and 206 to be easily separated from the pressuring layer 203 after the pressing.

Figure 22:
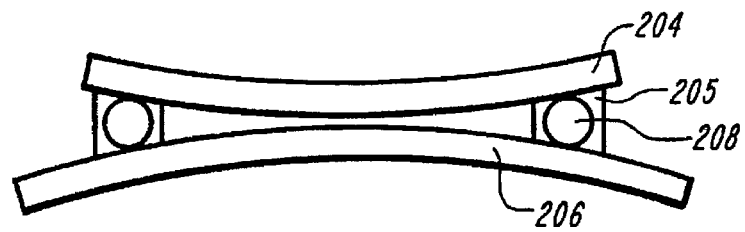
FIG. 22 is a cross sectional view of a liquid crystal panel according to a third example of the present invention in the middle of a production process.
Figure 23:
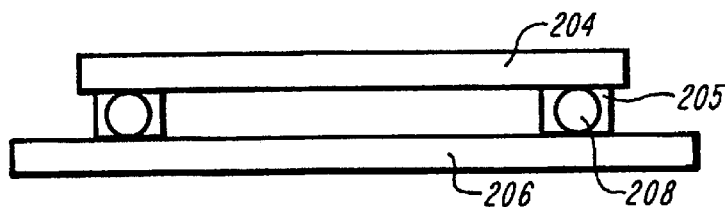
FIG. 23 is a cross sectional view of the liquid crystal panel in a state where the cell thickness is uniformized.

While the substrates 204 and 206 are pressed in the above-mentioned manner, ultraviolet is radiated to partially cure the sealing member 205. Since the substrates 204 and 206 are still deflected although very slightly in the display area, the sealing member 205 is cured in a state where the cell thickness is smaller inside than outside the sealing member 205 as is shown in FIG. 22. After the sealing member 205 is partially cured, the substrates 204 and 206 are heated to a temperature higher than the temperature at which the sealing member 205 is transited into glass. In such a process, the sealing member 205 is fully cured thermally once at a certain temperature, and then softened at the transition temperature. Due to the softening, the sealing member 205 is changed in shape so as to restrict the deflection of the substrates 204 and 206, using the restoring force of the substrates 204 and 206 generated by the deflection. By cooling the substrates 204 and 206 in such a state, a LCD device having an extremely small deflection at the display area can be obtained without using spacers to control the cell thickness.

A method for producing the LCD device according to the third example will be described in detail, hereinafter.

Figure 25:
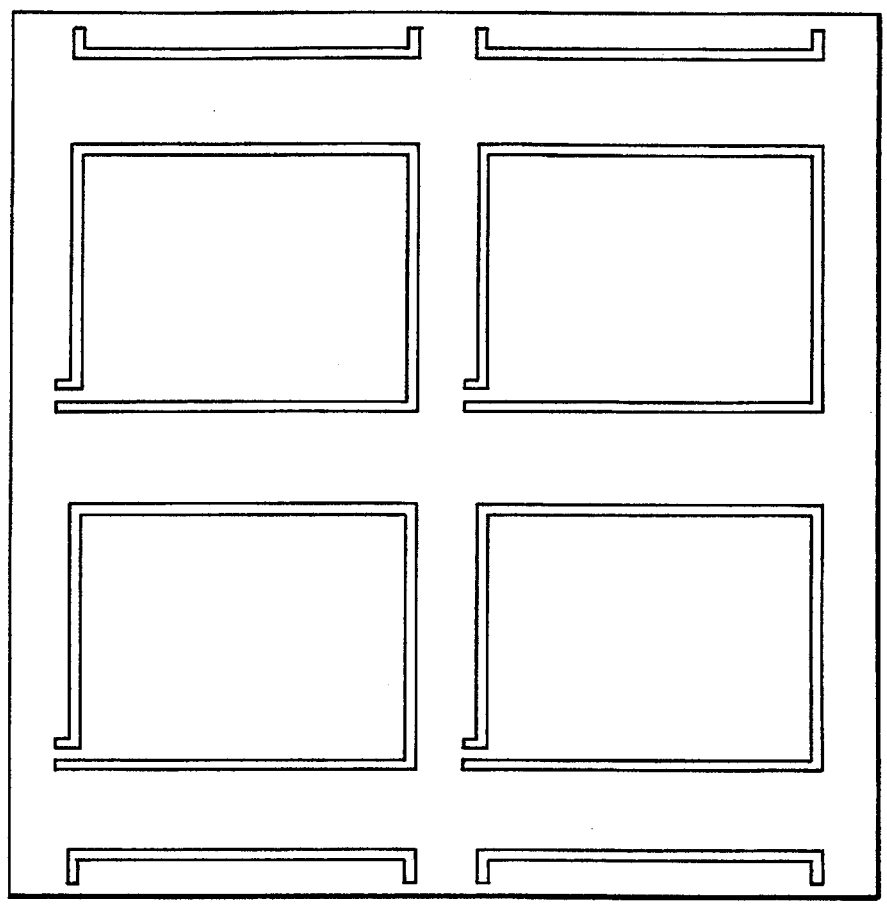
FIG. 25 is a plan view of liquid crystal panels with sealing patterns.

As the upper and the lower substrates 202 and 204, a glass plate having an outer profile of 150 mm×150 mm and a thickness of 1.1 mm (barium borosilicate glass; 7059 produced by Corning Inc.; modulus of longitudinal elasticity: $6.89 \times 10^3$ kg/mm$^2$; surface roughness: 10 µm or less) is used. Four 3-inch liquid crystal panels as is shown in FIG. 25 are produced. The substrates 204 and 206 each have an electrode for electrically controlling the liquid crystal and an alignment film on a surface thereof. The alignment film is treated by rubbing.

As the sealing members 205 for bonding the substrates 204 and 206, an epoxy acrylate ultraviolet curing resin having a viscosity of 45,000 cp (5 rpm) at a temperature of 25° C. and a thixotropic index of 3.3 (0.5 rpm/5 rpm) is used. The viscosity is measured by a Brookfield rotation viscosimeter (HBT type). As the spacers 208 to be mixed into the sealing member 205, a glass fiber (PF-50S produced by Nippon Electric Glass Corporated.; diameter: 5.0 µm; length: 15.0 µm) is used. The mixture ratio of the spacers 208 in the sealing member 205 is 50 mg/1 g. The lower substrate 206 is coated with sealing member 205 along sealing patterns shown in FIG. 25 by screen printing.

The resultant liquid crystal panel Is pressed using the pressing machine shown in FIG. 24.

Figure 26:
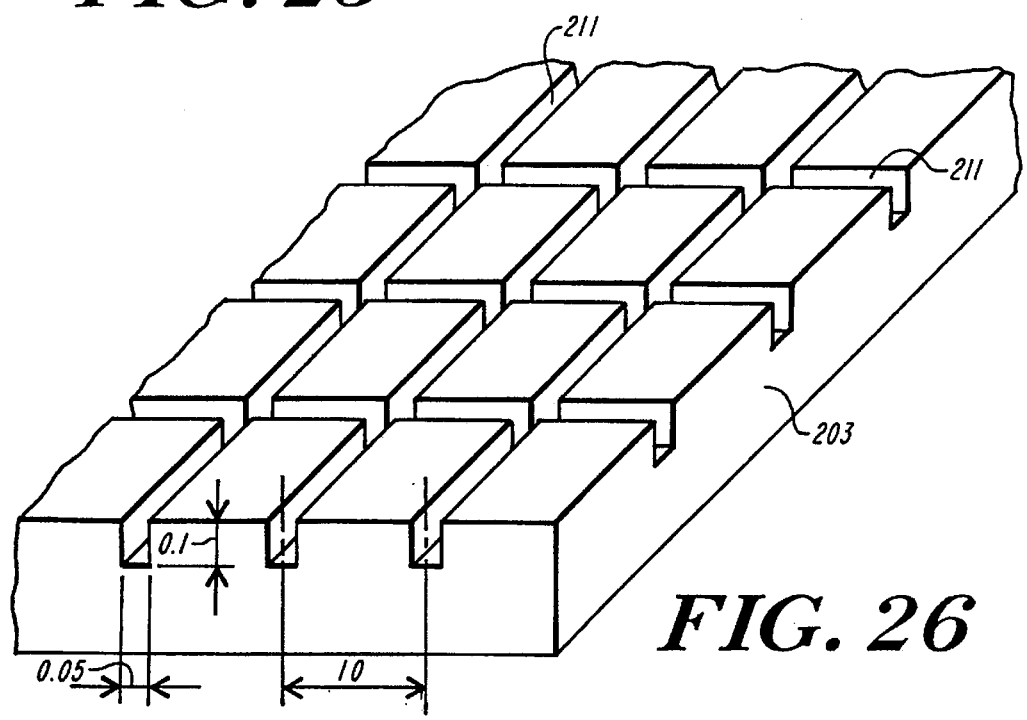
FIG. 26 is a perspective view of a pressuring member having a groove.

The pressurizing layer 203 is formed of silica glass (produced by Shin-etsu Sekiei Inc.; modulus of longitudinal elasticity: $7.4 \times 10^3$ kg/mm$^2$; surface roughness: 5 µm or less; outer profile: 150 mm×150 mm; thickness: 3 mm). In order to eliminate air from between the upper substrate 204 and the pressurizing layer 203, a groove (pitch: 10 mm; width: 0.05 mm; depth: 0.1 mm) as is shown in FIG. 26 is formed by dicing at a surface of the pressurizing layer 203 which is to be in contact with the upper substrate 204. Where the pressurizing layer 203 has a resiliency of $E_e$ against deflection and a surface roughness of $R_1$, and the upper substrate 204 has a resiliency of $E_a$ against deflection and a surface roughness of $R_w$, $E_e \geq E_a$ and $R_1 \leq R_w$.

Figure 27:
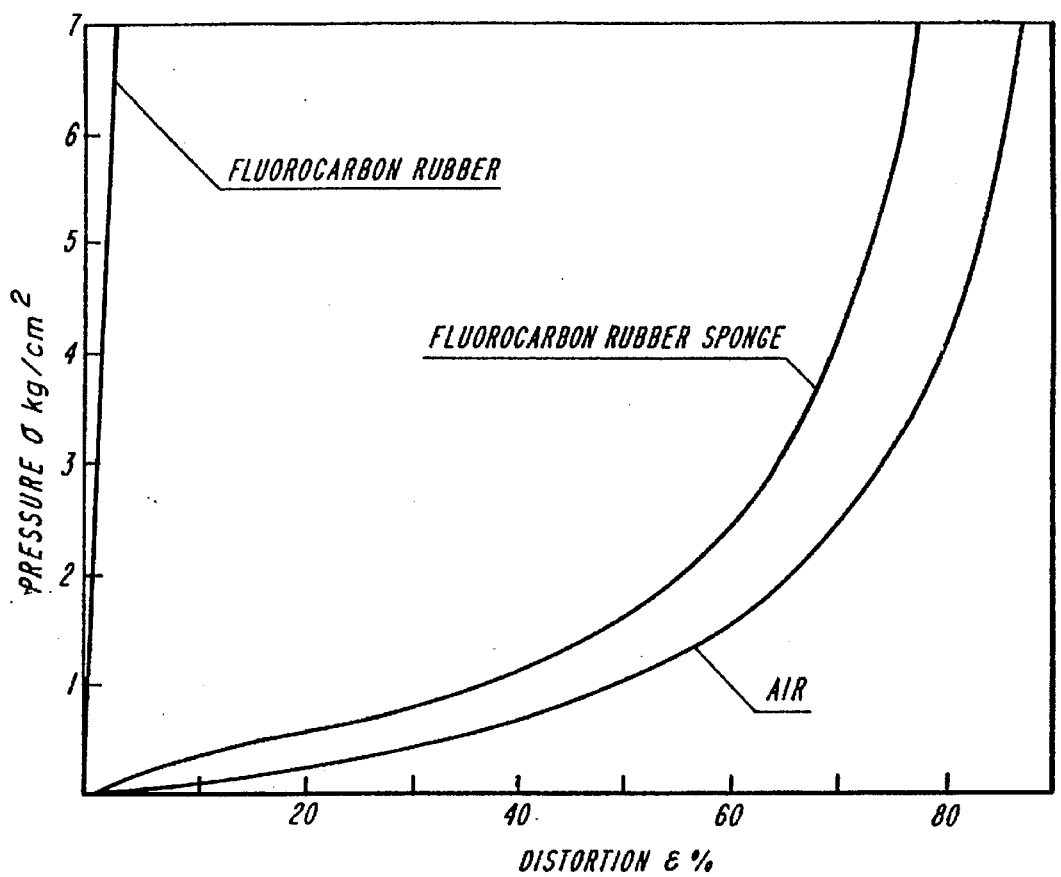
FIG. 27 is a graph showing the relationship between the pressing force per unit area and the distortion of various materials.

The buffering layer 202 is formed of, for example, a sponge (fluorocarbon rubber sponge produced by Tigers Polymer Inc.; outer profile: 150 mm×150 mm; thickness: 7 mm). Fluorocarbon rubber sponge, which is produced by foaming fluorocarbon rubber to approximately five times in volume, is excellent in the buffering property of absorbing the non-uniformity in distribution of the pressing force and shows the relationship between the pressing force and the distortion extremely similar to that of air as is shown in FIG. 27. The buffering layer 202 may be formed of any other material which is produced by foaming rubber or the like, has a property similar to that of a fluid conveying the pressing force uniformly, and includes uniform, microscopic and independent cells inside. Alternatively, the buffering layer 202 may be formed of an alkali halide crystal particle such as KCl or NaCl or solid conveying the pressing force such as pyroferrite. The pressurizing layer 203 and the buffering layer 202 may have any size and any shape which is sufficient to cover the sealing member 205 on the substrates 204 and 206. Desirably, the pressurizing layer 203 and the buffering layer 202 each have an identical size and shape with those of the substrates 204 and 206.

The liquid crystal panel is set in the pressing machine as is shown in FIG. 24 and pressed by a pressing force of 0.9 kg/cm$^2$ until the cell thickness is reduced to a specified value which is determined by the spacers 208 contained in the sealing member 205. In a state where the liquid crystal panel is pressed, ultraviolet is radiated from the side of the lower surface plate 207, thereby partially curing the sealing member 205. In an experiment, the liquid crystal panel was kept in the state of being pressed for 120 seconds, the ultraviolet was radiated for 90 seconds, and then the liquid crystal panel was kept in that state for another 120 seconds. The maximum deflection in the vicinity of a central portion of the display area was approximately 0.6 µm.

At this point, the sealing member 205 is cured in a state where the cell thickness is smaller inside than outside the sealing member 205 as is shown in FIG. 22. In order to soften the sealing member 205 and thus to compensate the shape thereof and also to perform final curing, the liquid crystal panel is sintered. Since the sealing member 205 is transited into glass at a temperature Tg of 120° C., the sintering was performed at a temperature of 150° C. for 30 minutes. After the sintering, the variation in the cell thickness at the display area was ±0.15 µm.

By injecting a liquid crystal into the resultant liquid crystal panel by vacuum injection, an LCD device having a cell thickness as uniform as in the case of the liquid crystal panel without the liquid crystal injected is produced.

In the third example, the substrates 204 and 206 are applied with the complex pressing member including the buffering layer 202 and the pressurizing layer 203. Thus, even in a state where the substrate 204 is entirely applied with a load, the sealing member 205 can effectively be pressed so as to maintain the cell thickness only by the sealing member 205 without using spacers in a display area. Accordingly, an LCD device having a uniform cell thickness, a high ratio of a total area of pixels with respect to the display area, and a high contrast can be obtained.

The buffering layer 202 may be formed of an elastic body including a gas or a liquid, or formed of a solid such as alkali halide crystal particles or pyroferrite. The pressing layer 203 may be formed of any material which has a higher resiliency than that of the buffering layer 202.

EXAMPLE 4

A method for producing an LCD device according to a fourth example of the present invention will be described, hereinafter.

A sealing member is formed of an epoxy resin and is cured both by ultraviolet and thermally. The sealing member contains a polymerization initiator which is activated by ultraviolet radiation and a material which is thermally activated. In order to cure such a sealing member, it is necessary to radiate ultraviolet of 9,000 mJ having a wavelength of 365 nm and to sinter at a temperature of 150° C. for 30 minutes after the ultraviolet radiation. At a temperature of 25° C., the sealing member has a viscosity of 224,000 cp (5 rpm) measured by a Brookfield rotation viscosimeter and a thixotropic index of 5.0 (0.5 rpm/5 rpm ).

Figure 28:
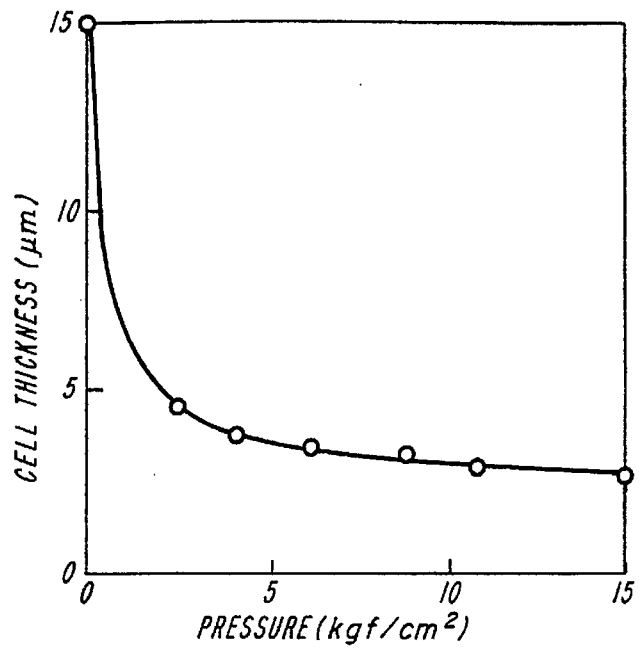
FIG. 28 is a graph showing the relationship between the pressing force per unit applied to a sealing member and the cell thickness according to a fourth example of the present invention.

The relationship between the pressing force per unit ($\sigma$(kgf/cm$^2$) and the cell thickness (d(µm)) of the sealing member which determines the cell thickness is approximated by Equation 1: $\sigma = Fd^n$. In the fourth example, F=1,334 and n=–3.5. The above-mentioned relationship is as shown in FIG. 28.

In the fourth example, a cell thickness having a thickness of 5 µm is to be obtained. From Equation 1, the pressing force per unit area can be determined as 4.8 kgf/cm$^2$.

A practical method for producing an LCD device according to the fourth example will be described with reference to FIGS. 29 through 34.

Figure 29:
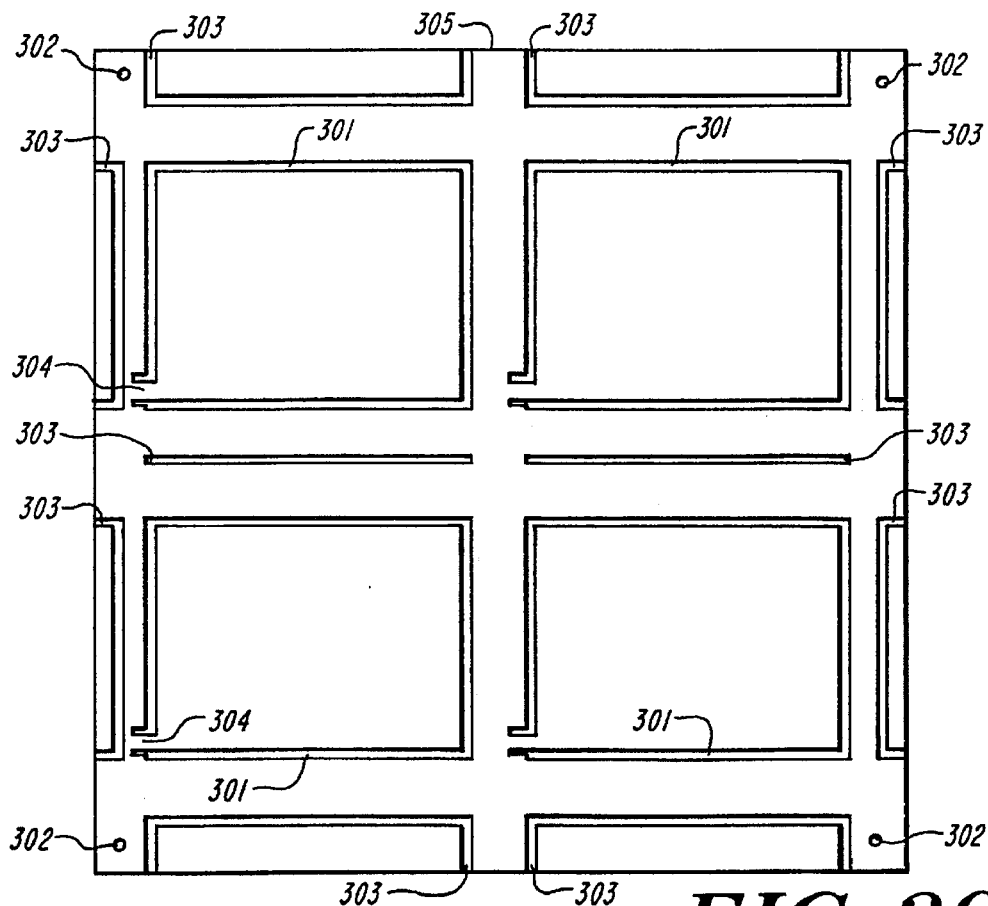
FIG. 29 is a plan view of liquid crystal panels with sealing patterns, partial bonding patterns, and dummy patterns.

FIG. 29 shows sealing patterns 301 for sealing a liquid crystal panel, partial bonding patterns 302 for partially bonding upper and the lower substrates 306 and 307 of the liquid crystal panel, and dummy patterns 303 for promoting uniform distribution of the pressing force per unit area applied to the upper substrate 306.

An upper substrate 306 and a lower substrate 307 (FIG. 34) are each formed of a glass having an outer profile of 150 mm×150 mm and a thickness of 1.1 mm (7059 produced by Corning Inc.). On the lower substrate 307, TFTs including an amorphous silicon layer and having a size of 3.0 inches are arranged along the sealing patterns 301 in FIG. 29, thereby producing a TFT substrate 307a. On the upper substrate 306, a color filter 328 are provided, thereby producing a CF substrate 306a. Inner surfaces of the TFT substrate 307a and the CF substrates 306a are each coated with a polyimide alignment film 326, which is treated by rubbing. The CF substrate 306a is coated with an ultraviolet curing resin in a pattern shown in FIG. 29 by screen printing.

The TFT substrate 307a is coated with a conductive carbon resin at a contact terminal thereof which is to be connected to a counter electrode of the CF substrate 306a. The conductive carbon resin used here has a viscosity of 11,000 cp (5 rpm) at a temperature of 25° C., which is sufficiently smaller than the viscosity of the ultraviolet curing resin.

A sealing member 308 is provided to have an average height of 16±2 µm and a width of 300±30 µm. When the liquid crystal panel is pressed until the cell thickness thereof is reduced to 5 µm, the entire area of the sealing member 308 is approximately 20 cm$^2$. Based on this result and the pressing force per unit area obtained from Equation 1, the pressing load for controlling the cell thickness is determined to be 96 kgf.

The TFT substrate 307a and the CF substrate 306a are assembled after pixel sections thereof are aligned with each other. Ultraviolet is radiated only to the partial bonding patterns 302 to cure the ultraviolet curing resin, thereby partially bonding the TFT substrate 307a and the CF substrate 306a.

Figure 30:
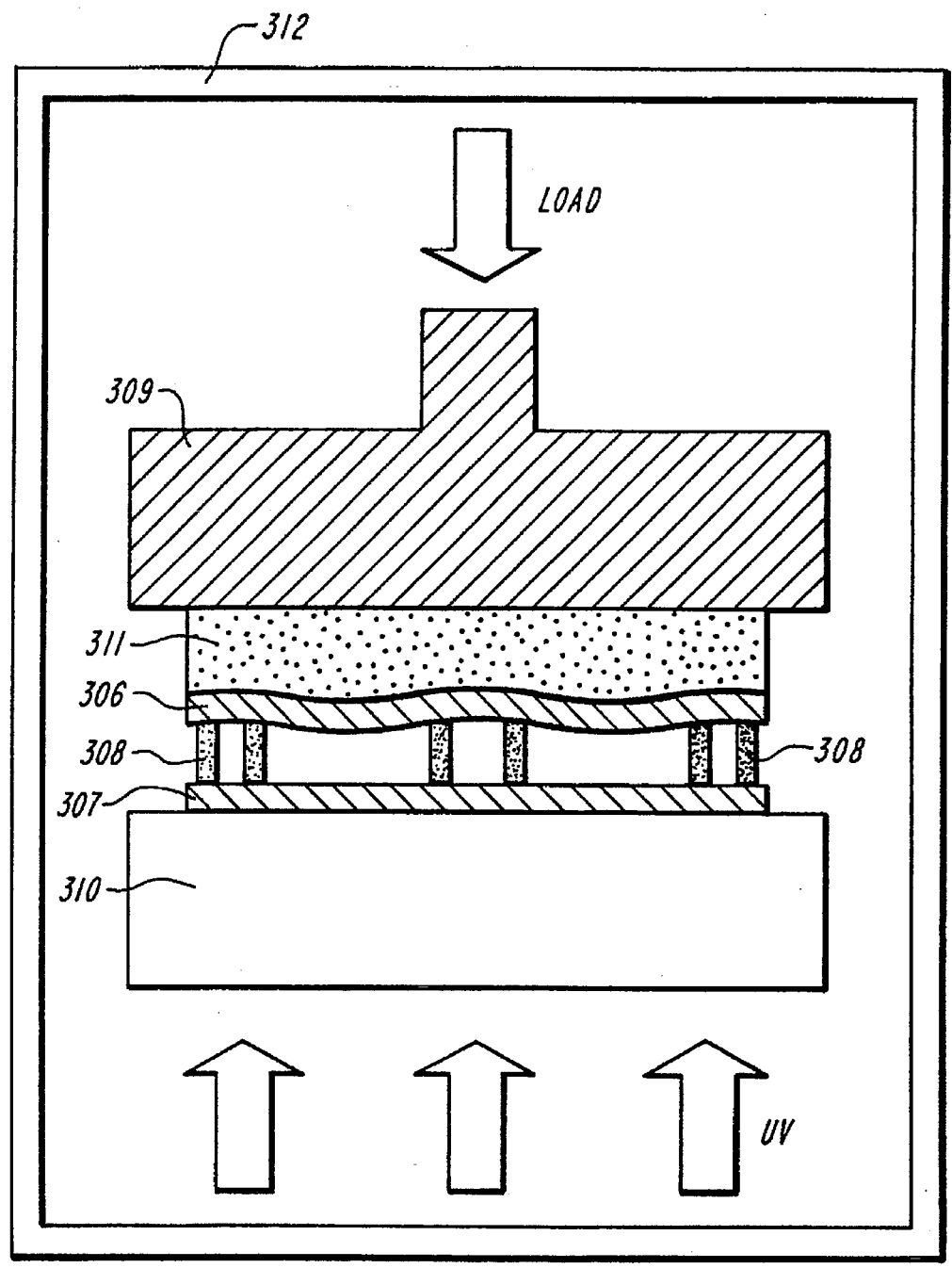
FIG. 30 is a cross sectional view of a pressing machine used according to the fourth example.

FIG. 30 shows a schematic view of a pressing machine which is used for controlling the cell thickness. An upper surface plate 309 and a lower surface plate 310 are set in a tank 312 in which the temperature is controlled to be in the range from room temperature to 50° C. with an error of ±1.5° C. The lower surface plate 310 is provided with an ultraviolet radiation apparatus for radiating ultraviolet to the entire liquid crystal panel placed on the lower surface plate 310. The ultraviolet radiation apparatus, which uses a high-pressure mercury-vapor lamp, radiates ultraviolet having a wavelength of 365 nm at an intensity of 60 mW/cm$^2$. The upper surface plate 309 is provided with a buffering layer 311 for uniformly distributing a pressing force to the entire upper substrate 306. The buffering layer 311 is formed of a fluorocarbon rubber sponge 3 mm$^t$ produced by Tigers Polymer Inc. in the fourth example.

The temperature of the liquid crystal panel is controlled to be 25°±1.5° C. in the tank 312, and the liquid crystal panel is pressed by the pressing load of 96 kgf obtained above. By continuously applying such a load for 90 seconds, the sealing member 308 obtains a stable thickness of 5 µm.

While the liquid panel is pressed, ultraviolet is radiated for 150 seconds to cure the sealing member 308. Since such a curing reaction is continued for 90 seconds after the radiation is stopped. The liquid crystal panel is pressed for 120 seconds. Then, the liquid crystal panel is taken out of the pressing machine.

The liquid crystal panel is sintered in an oven of a temperature of 150° C. for 30 minutes, thereby thermosetting the sealing member 308. Since the thermosetting is performed at a temperature higher than 120° C., at which the sealing member 308 is transited to glass, the distortion of the liquid crystal panel caused by the pressing process is also alleviated. In an experiment, the maximum distortion was reduced from 0.8 μm before the sintering to 0.4 μm after the sintering.

Figure 31:
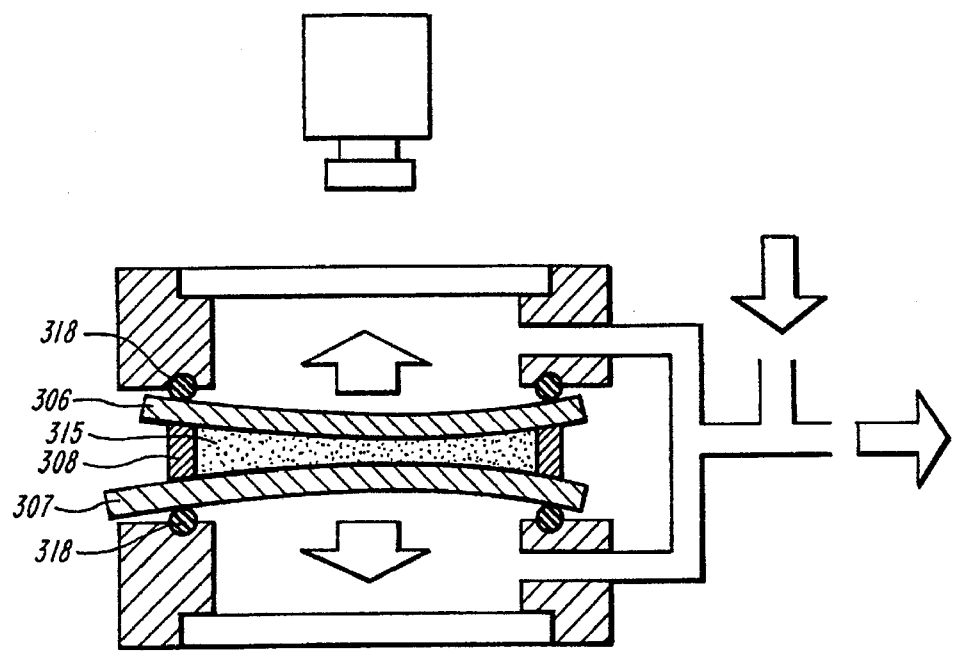
FIG. 31 is a view of an apparatus for adjusting the cell thickness of the LCD device produced according to the fourth example.
Figure 34:
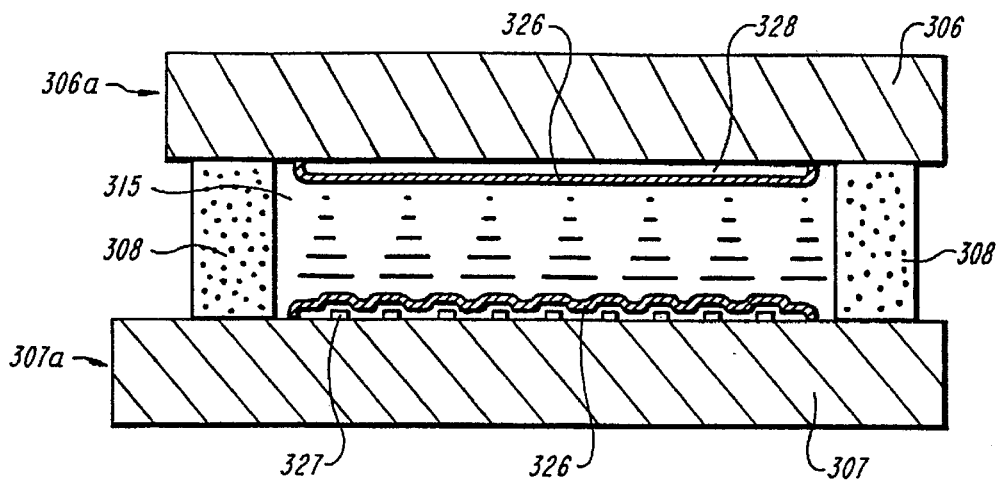
FIG. 34 is a cross sectional view of an LCD device produced according to the fourth example.

After the sintering, the liquid crystal panel is cleaved, and a liquid crystal 315 is injected as is shown In FIG. 34. At this point, the cell thickness is smaller at a central portion by 0.8 μm than in the vicinity of a sealing member 308 since no spacer is used. The liquid crystal 315 is still forcibly injected by pulling the upper and the lower substrates 306 and 307 by an apparatus laving a vacuum pressure level (FIG. 31). Such an operation is performed while measuring the cell thickness. When the cell thickness gets in the range of 5±0.15 μm, the liquid crystal 315 at an injection opening is removed by a $N_2$ blower. The injection opening is coated with an ultraviolet curing resin, which is then cured by ultraviolet radiation.

By this method, an LCD having a uniform cell thickness can be obtained without using spacers.

Figure 33:
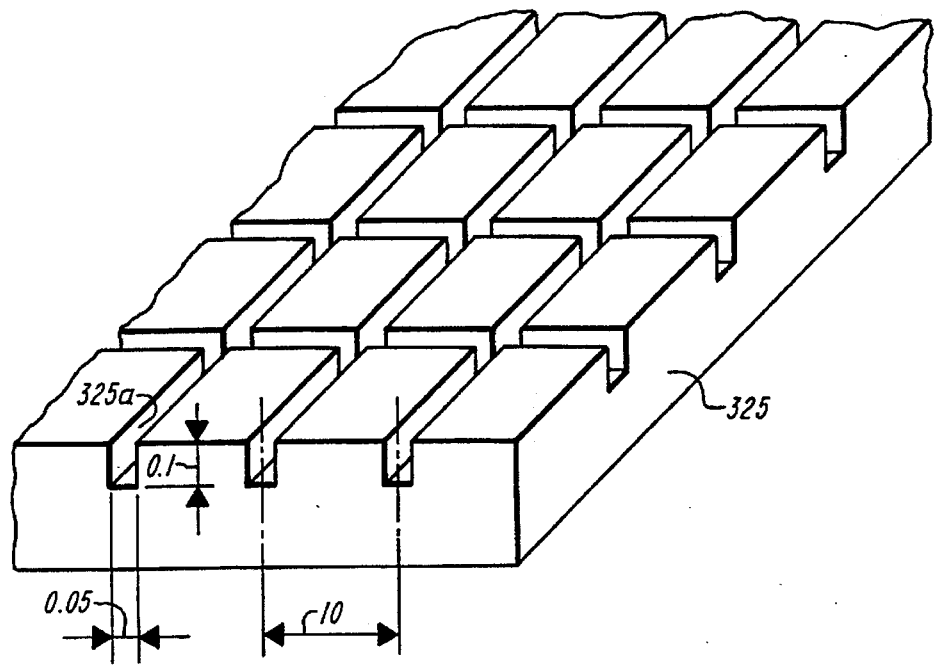
FIG. 33 is a perspective view of a buffering layer having a groove.
Figure 32:
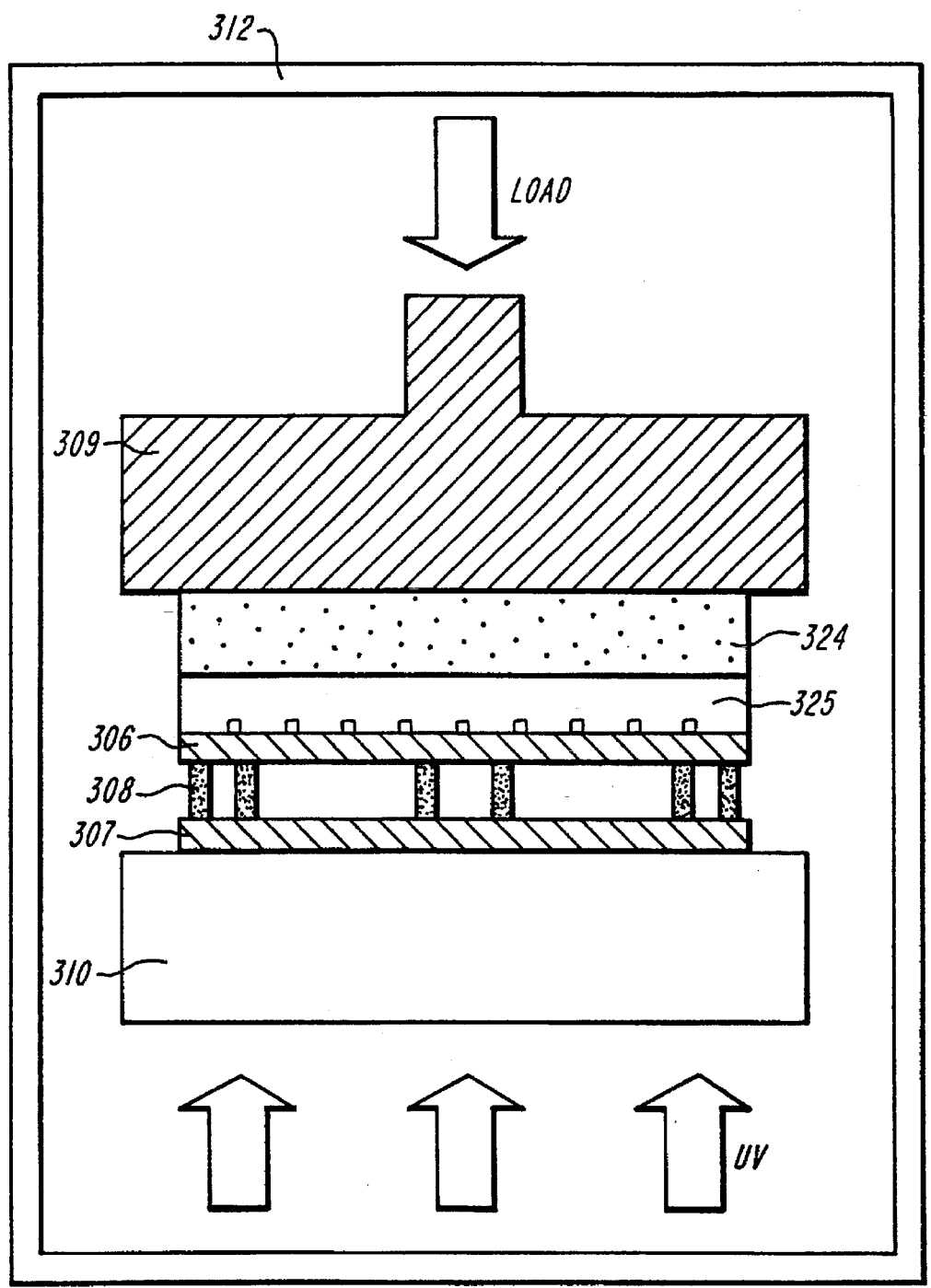
FIG. 32 is a view of a pressing machine used in a modification of the fourth example.

In a modification of the above-mentioned method, a complex buffering member including a first buffering layer 324 and a second buffering layer 325 (FIG. 32) is used instead of the single buffering layer 311. The first buffering layer 324 is formed of fluorocarbon rubber sponge 7 mm$^t$ (produced by Tigers Polymer Inc., and the second buffering layer 325 is formed of silica glass 3 mm$^t$ (produced by Shin-etsu Sekiei Inc.). The silica glass used as the second buffering layer 325 has a modulus of longitudinal elasticity of $7.4 \times 10^3$ kg/mm$^2$ and a surface roughness of 10 μm or less, and has a groove 325a as is shown in FIG. 33 formed by dicing. The groove 325a has a pitch of 10 mm, a width of 0.05 mm, and a depth of 0.1 mm. Due to the groove 325a, air is eliminated from between the upper substrate 306 and the second buffering layer 325, thereby realizing uniform distribution of the pressing force. The maximum distortion of the liquid crystal panel was 0.6 μm when the sealing member 308 was cured by the ultraviolet radiation, and 0.3 μm when the sealing member 308 was cured by sintering. By injecting the liquid crystal 315 between the upper and the lower substrates 306 and 307, an LCD device having the cell thickness of 5±0.1 μm was produced. Such an LCD device is superior to the LCD device produced by using the single buffering layer 311.

EXAMPLE 5

A method for producing an LCD device according to a fifth example of the present invention will be described with reference to FIGS. 35 through 44.

Figure 35:
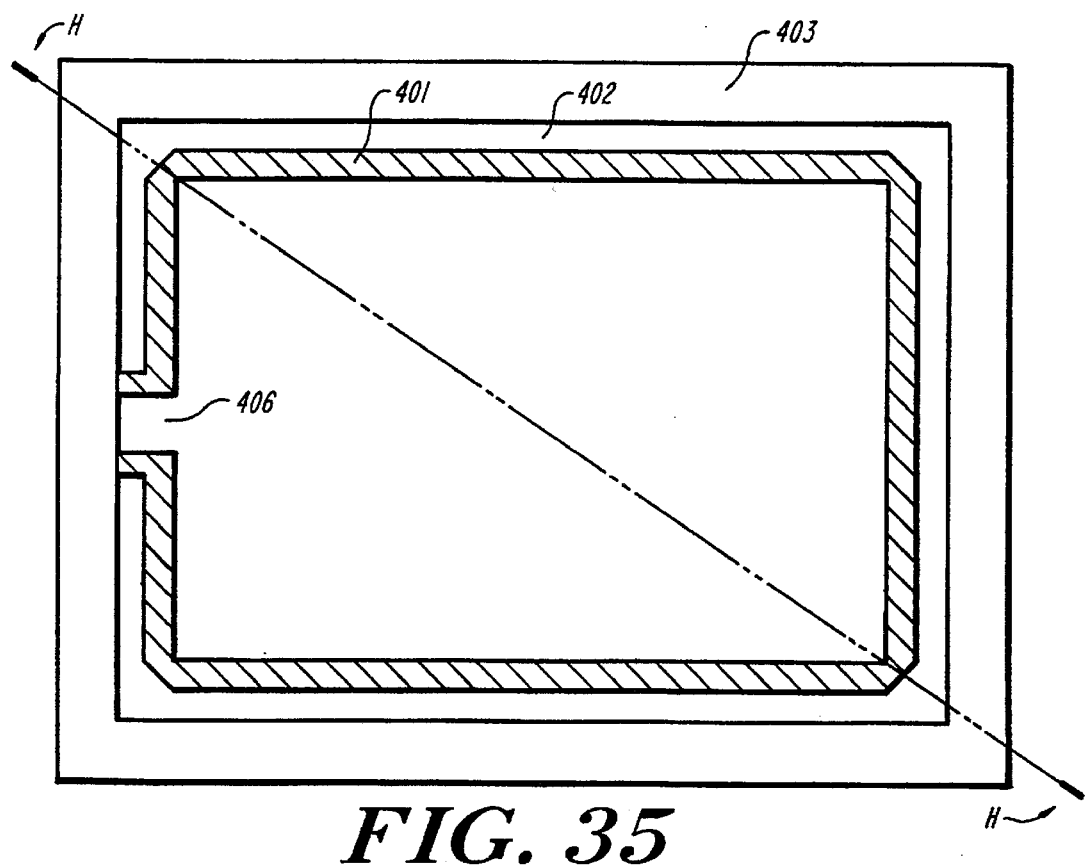
FIG. 35 is a plan view of a liquid crystal panel according to a fifth example of the present invention.

A TFT substrate 403 having TFTs thereon and a counter substrate 402 having a color filter thereon are each formed of a glass having a thickness of 1.1 mm (7059 produced by Corning Inc.). As is shown in FIG. 35, the counter substrate 402 is coated with a thermosetting resin 401 by printing along a sealing pattern except for an injection opening 406. The TFT substrate 403 and the counter substrate 402 are assembled into a liquid crystal panel without scattering spacers. The thermosetting resin 401 includes particles of glass fiber each having a diameter of 5.0 μm in a mixture ratio of 50 mg of the glass fiber in 1 g of the resin.

The liquid crystal panel is pressed by a pressing machine until the cell thickness thereof is reduced to the diameter of the glass fiber particles. Then, the liquid crystal panel is sintered in an oven of a temperature of approximately 170° C. for an hour or more, thereby curing the resin 401.

It was found by measurement of the cell thickness that the surface roughness of a portion of the substrate corresponding to the display area was within ±5% with respect to a specified cell thickness.

After the liquid crystal panel is cleaved into pieces, a liquid crystal 407 is injected into each liquid crystal panel in the following manner.

Figure 36:
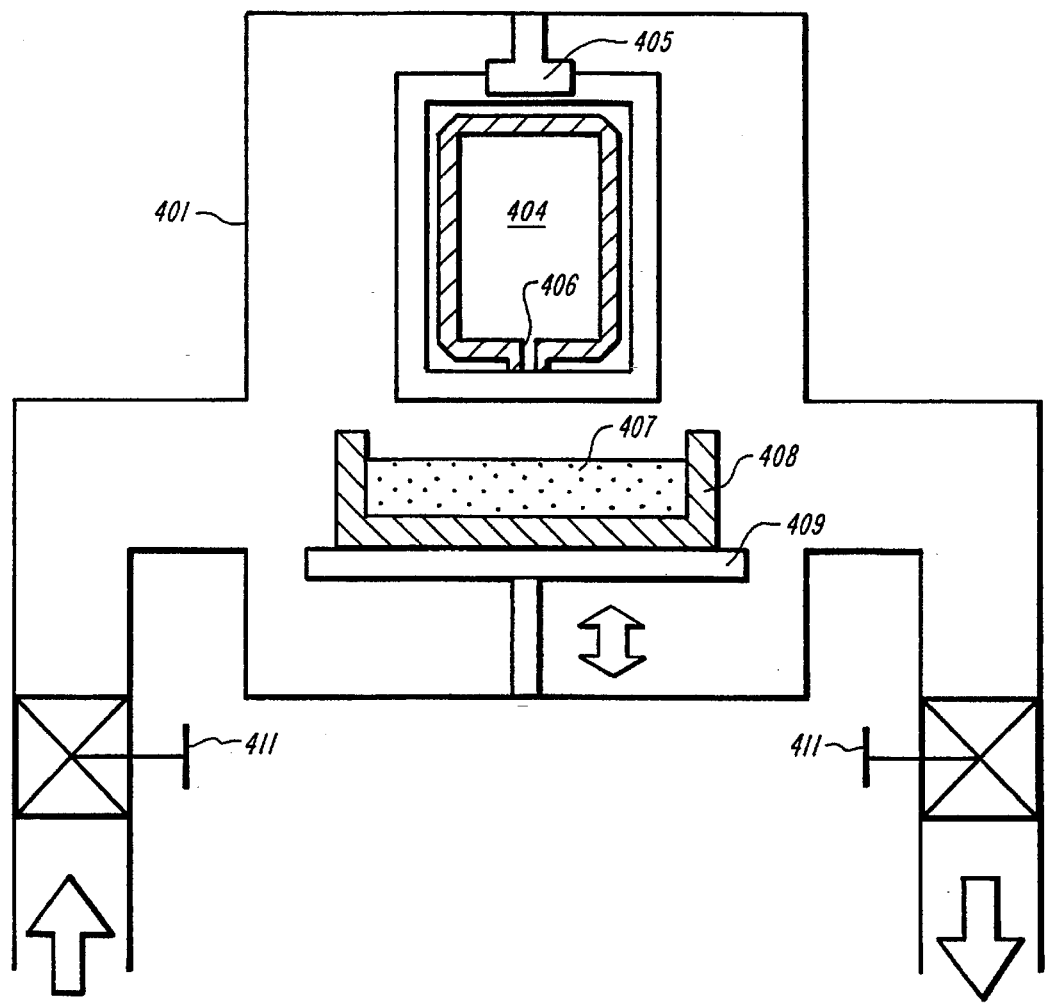
FIG. 36 is a cross sectional view of an injection apparatus according to the fifth example.

As is shown in FIG. 36, a necessary number of liquid crystal panels 404 are set in an injection apparatus 410 in a state where injection openings 406 thereof are aligned. A tank 408 is also set in the injection apparatus 410, the tank 408 containing an amount of the liquid crystal 407 corresponding to the number of the liquid crystal panels 404. The pressure in a chamber of the injection apparatus 410 is reduced to 1 to $3 \times 10^{-4}$ tort or less by a pump, thereby sufficiently defoaming the liquid crystal 407 in the chamber. Then, the pump is stopped, and a movable stage 409 having the tank 408 thereon is elevated to immerse the injection openings 406 in the liquid crystal 407. Then, leak valves 411 are released to introduce nitrogen gas into the chamber.

When the nitrogen gas is introduced, the liquid crystal 407 is simultaneously injected into the liquid crystal panels 404. The pressure in the chamber is increased, but not to an atmospheric level at one time. Instead, when a vacuum gauge in the chamber shows 76 cmHg, the pressure is reduced at a ratio of 1 cmHg/min. It takes approximately 76 minutes to return the pressure to an atmospheric level.

When the pressure is returned to an atmospheric level, one of the liquid crystal panels 404 is taken out to check the cell thickness thereof. According to a conventional method, the counter and the TFT substrates 402 and 403 are contacted or adhered onto each other as is shown in FIG. 38 since a supporting member for maintaining the cell thickness does not exist (FIGS. 37 through 40). Or the cell thickness is so small that it takes a long time to completely absorb the liquid crystal 407. According to the fifth example, however, the cell thickness is changed as is shown in FIGS. 41 through 43 by controlling the difference in the pressure between inside and outside the chamber. Although the counter and the TFT substrates 402 and 403 are slightly distorted when the nitrogen gas is introduced into the chamber, the two substrates 402 and 403 can be prevented from contacting each other. As a result, damage of the alignment films and defective injection of the liquid crystal 407 are avoided, and further the injection period is significantly shortened.

The cell thickness is small immediately after the liquid crystal 407 is injected, but can be increased to 5.0 μm at the fastest by immersing the liquid crystal panel in the liquid crystal 407 for approximately four hours and then leaving in natural circumstances. Thus, the cell thickness can be controlled by the injection period.

In the case when the pressure in the chamber including several tens of liquid crystal panels is rapidly increased to an atmospheric level at one time, the two substrates are adhered to each other In almost all the liquid crystal panels. In an experiment, the two substrates started to be separated after 6.5 hours since the pressure was reduced to a vacuum level, but the liquid crystal was still not injected to fill the gap between the two substrates even after 10 hours from the pressure reduction.

Figure 44:
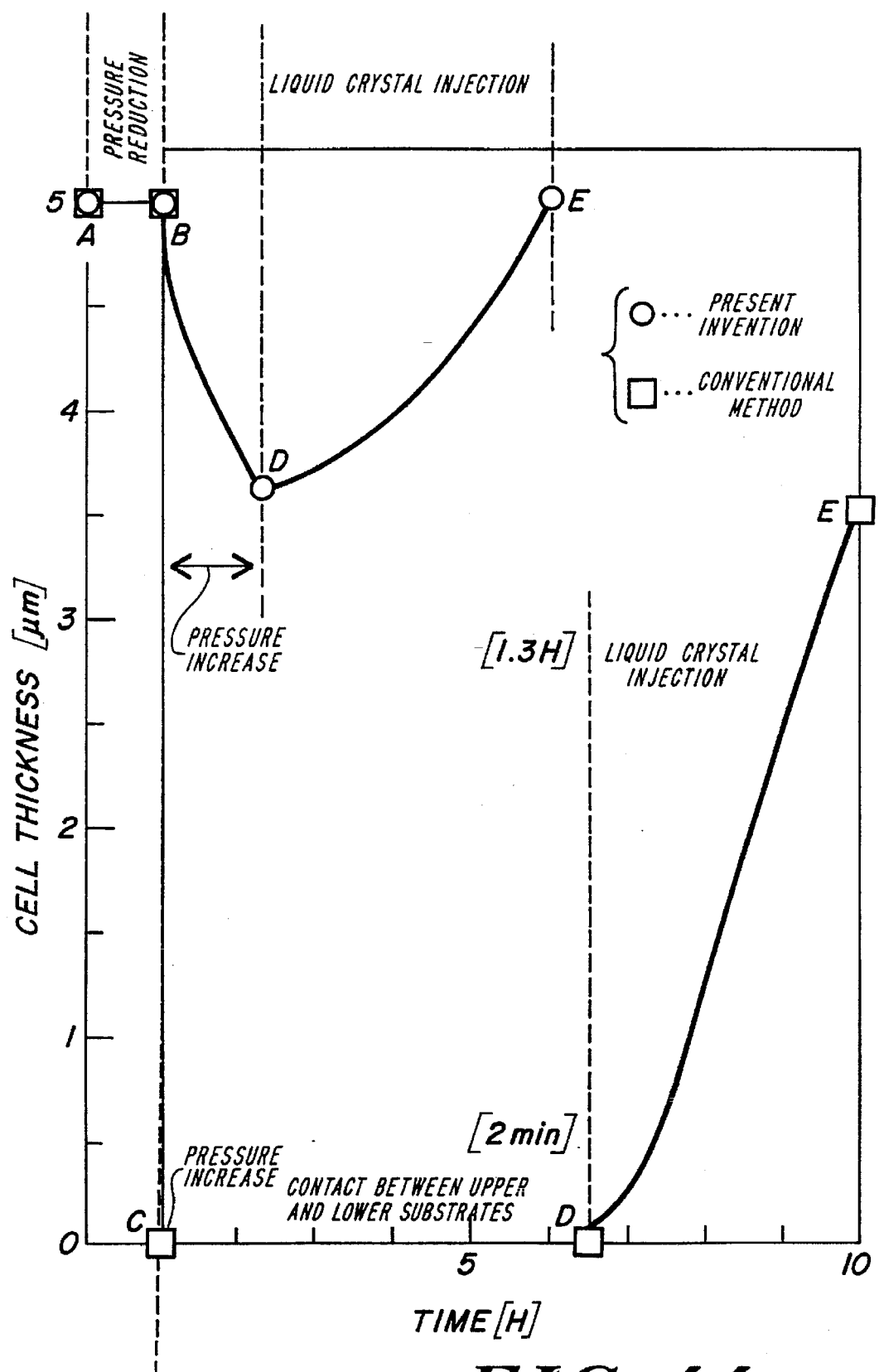
FIG. 44 is a graph showing the relationship between the injection period and the cell thickness of a method according to the fifth example of the present invention and a conventional method.

According to a method of the fifth example, it takes time to return the pressure in the chamber to an atmospheric level, but improves the production yield and shortens the injection period in the end, compared to the case when the pressure is increased to an atmospheric level at one time. FIG. 44 shows the relationship between the injection period and the cell thickness.

When the liquid crystal 407 is injected to all the liquid crystal panels, the liquid crystal 407 at the injection openings 406 are sufficiently wiped out. The injection openings 406 are coated with an ultraviolet curing resin until the ultraviolet curing resin fully covers the injection openings 406, when ultraviolet is radiated to seal the injection openings 406. In the LCD devices obtained in this manner, the variation in the cell thickness was within ±5%.

According to the fifth example of the present invention, a high quality LCD device can be produced since the liquid crystal can be filled and the injection opening can be sealed while maintaining the cell thickness uniform.

By controlling the injection of the liquid crystal based on the pressure and time, even an LCD device having a cell thickness of 1 inch or more can be produced without spacers, and further various problems concerning the injection can be solved.

Various other modifications will be apparent to and can be readily made by those skilled in the art without departing from the scope and spirit of this invention. Accordingly, it is not intended that the scope of the claims appended [er]e to be limited to the description as set forth herein, but rather that the claims be broadly construed.

What is claimed is:

1. A method for producing a liquid crystal display, the liquid crystal display including a first substrate, a second Substrate opposing the first substrate and a liquid crystal interposed therebetween, the method comprising the steps of:

pressing the first substrate and the second substrate interposing a sealing member which contains a spacer mixed therein and which is provided to surround a display region for conducting a display, while an elastic sheet having a cutout corresponding to the display region is disposed on one surface of the first substrate and the second substrate thereby forming a gap between the first and the second substrates in the display region larger than that in a region where the sealing member is provided, the surface on which the elastic sheet is disposed being out of contact with the sealing member;

curing the sealing member; and injecting the liquid crystal into the gap.

2. A method for producing a liquid crystal display device according to claim 1, wherein the elastic sheet has a surface roughness on both surfaces thereof, waves of the surface roughness having a height of 5 μm to 30 μm and a periodicity of 200 μm to 800 μm.

3. A method for producing a liquid crystal display device according to claim 1, wherein the cutout has a shape which fulfills the following formula:

$$Y/3 \leq X \leq Y/2$$

where X is the distance between an end of the cutout of the elastic sheet and an outer perimeter of the region where the sealing member is provided after the first and the second substrates are pressed, and Y is the width of the region where the sealing member is provided after the first and the second substrates are pressed.

4. A method for producing a liquid crystal display device according to claim 1, wherein the gap between the first and the second substrates gradually increases as the distance from the region where the sealing member is located increases.

5. A method for producing a liquid crystal display device including two substrates combined together through a sealing member containing a spacer mixed therein, the spacer determining a thickness of a gap between the substrates, the gap including no spacer in a display area at a central portion thereof, the method comprising the steps of:

entirely pressing at least one of the substrates by a complex pressing medium including a buffering member and a pressing member; and curing the sealing member and thus adhering the substrates to each other in a state of being pressed wherein said complex pressing medium includes a groove formed at least at one surface thereof for eliminating air from between the pressing medium and one of the two substrates in contact with said complex pressing medium.

6. A method for producing e liquid crystal display device according to claim 5, wherein the buffering member is formed of a material selected from the group consisting of an elastic material and a solid, the elastic material including a substance selected from the group consisting of a gas and a solid, the solid being selected from the group consisting of alkali halide crystal particle and pyroferrite.

7. A method for producing a liquid crystal display device according to claim 5, wherein at least one of the buffering member and the pressing member has a flatness which is equal or more than that of the two substrates and a resiliency against deflection which is higher than that of the two substrates, and wherein the complex pressing medium is arranged so that a flat surface thereof is in contact with at least one of the two substrates.

8. A method for producing a liquid crystal display device according to claim 5, further comprising the step of heating the sealing member to a temperature higher than the temperature at which the sealing member is transited to glass, after the sealing member is cured.

9. A method for producing a liquid crystal display device according to claim 5, wherein the sealing member contains a polymerization initiator which is activated by ultraviolet radiation and a material which is thermally activated.

10. A method for producing a cell including a pair of substrates assembled with a sealing member used for a liquid crystal display device, comprising the steps of:

applying the sealing member on a first substrate so as to define a display area substantially enclosed by the sealing member, the display area including no spacer;

attaching a second substrate on the first substrate to form a panel;

pressing the panel so that the spacer determines a gap between the first and second substrates, under a condition that a pressure applied on the panel in a region other than a portion corresponding to the display area is substantially larger than that on the panel in the portion corresponding to the display area; and curing the sealing member so as to produce the cell in which d D, where D is a distance between the first and second substrates in the display area, and d is a distance between the first and second substrates spaced by the spacer.

11. A method for producing a cell including a pair of substrates assembled with a sealing member used for a liquid crystal display device according to claim 10, wherein $D \leq 1.2 \times d$.

12. A method for producing a cell including a pair of substrates assembled with a sealing member used for a liquid crystal display device according to claim 10, wherein in the applying step, the sealing member is applied so that the display area has at least one side having a length of 25 mm or more.

13. A method for producing a cell including a pair of substrates assembled with a sealing member used for a liquid crystal display device according to claim 10, wherein in the applying step, the sealing member is applied to define a plurality of the display areas so that the panel includes the plurality of the cells.

14. A method for producing a cell including a pair of substrates assembled with a sealing member used for a liquid crystal display device according to claim 10, wherein the pressing step comprises the steps of:

providing an elastic sheet having a cutout corresponding to the display area onto a surface of the panel, and applying a pressure on the panel through the elastic sheet.

15. A method for producing a cell including a pair of substrates assembled with a sealing member used for a liquid crystal display device according to claim 14, wherein the elastic sheet is placed so that an edge of the cutout is positioned within a width of the applied sealing member in the providing step.

16. A method for producing a cell including a pair of substrates assembled with a sealing member used for a liquid crystal display device according to claim 14, wherein both sides of the elastic sheet have a roughness with a height difference of 5 µm to 30 µm with a period of 200 µm to 800 µm.

* * * * *